United States Patent [19]

Benken

[11] Patent Number: 4,672,570

[45] Date of Patent: Jun. 9, 1987

[54] NETWORK INTERFACE MODULE AND METHOD

[75] Inventor: Richard P. Benken, West Chester, Ohio

[73] Assignee: The United States of America as represented by the Secretary of the Air Force, Washington, D.C.

[21] Appl. No.: 905,596

[22] Filed: Sep. 5, 1986

[51] Int. Cl.$^4$ ............................................... G06F 3/14
[52] U.S. Cl. ................................................... 364/900
[58] Field of Search ................................ 364/200, 900

[56] References Cited

U.S. PATENT DOCUMENTS

| | | | |
|---|---|---|---|
| 3,988,716 | 10/1976 | Anderson | 364/200 |
| 4,071,887 | 1/1978 | Daly et al. | 364/200 |
| 4,144,550 | 3/1979 | Donohue et al. | 364/107 |
| 4,154,985 | 5/1979 | Munter | 179/15 BV |
| 4,280,285 | 7/1981 | Haas | 434/30 |
| 4,549,275 | 10/1985 | Sukonick | 364/521 |
| 4,587,633 | 5/1986 | Wang et al. | 364/900 |
| 4,604,682 | 8/1986 | Schwan et al. | 364/200 |

Primary Examiner—Gareth D. Shaw
Assistant Examiner—Daniel K. Dorsey
Attorney, Agent, or Firm—Bernard E. Franz; Donald J. Singer

[57] ABSTRACT

An interface module and associated software connect a broad range of computer systems to a real time local area network. It connects to a host computer system that needs only to use parallel data input/output ports in order to communicate with the module. Hardware on the interface module accomplishes transmitting data to and receiving data from the local area network, all of these transfers of data being via a buffer memory. The interface module is capable of transmitting and receiving serial data at a rate of ten megabits per second, can store approximately 14 kilobytes of this data internally in the buffer memory, and can then transfer the data to or from a host computer system at a rate of 16 bits every 719 nanoseconds. A graphics processor is used to drive real-time graphics displays in the cockpit of a simulator and the module of this invention interfaces the graphics processor to a minicomputer.

8 Claims, 8 Drawing Figures

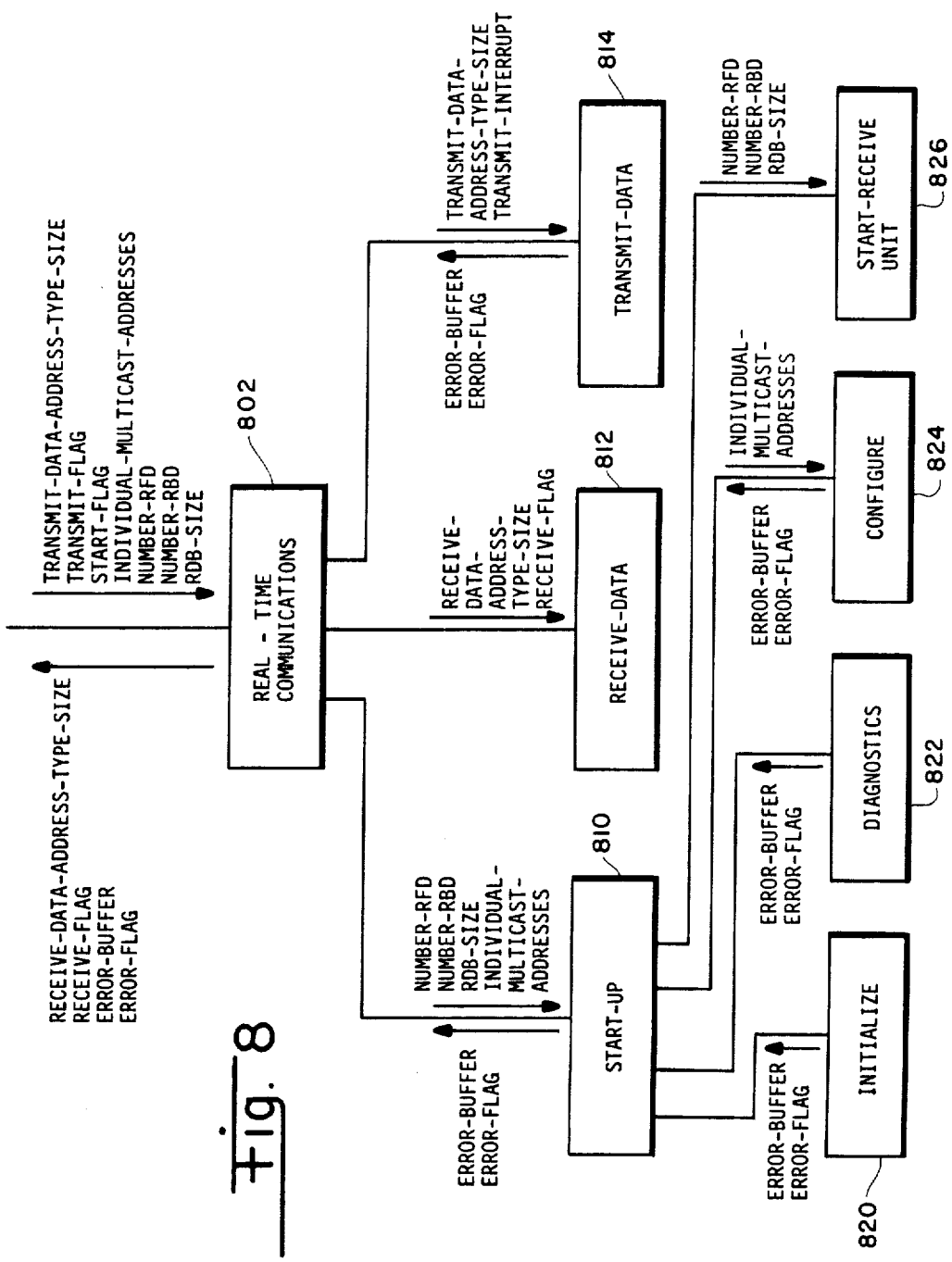
Fig. 8  STRUCTURE CHART OF HOST SOFTWARE

4,672,570

NETWORK INTERFACE MODULE AND METHOD

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a network interface module and method of operation, and more particularly to an interface board and software for connecting a broad range of computer systems to a real time local area network.

It was decided that a local area network (LAN) should be used to solve problems associated with coupling a mainframe computer system to cockpits, etc in real-time pilot-in-the-loop aircraft simulation. The pilots participate in these simulations in cockpits that are located throughout the facility. Other equipment necessary to the simulation is also located at a considerable distance from the mainframe system. The mainframe system must not only run the simulation program, but must also calculate all the parameters to control these cockpits and equipment. The control parameters must then be output on more than one hundred analog and digital control lines. Information from the cockpits and equipment is also gathered by inputting many other analog and digital control lines.

Several problems with this method of operation can be seen immediately. The first is that the mainframe system is performing hundreds of input/output instructions in order to control cockpits and other equipment, instead of working on the simulation program. This means that as new equipment and more sophisticated cockpits are added, there is less memory and less computing power left in the mainframe system with which to accomplish the simulation program. Also, since the cockpits and other equipment are located at a considerable distance from the mainframe system, all analog lines can pick up a noticeable amount of electrical noise. Another problem occurs when new equipment or a cockpit is added to the simulation system. This is the adding of a hundred or more control lines that must be placed between the new item and the mainframe system. A special interface may be necessary for a new piece of equipment, if it is not directly compatible with the mainframe system.

To correct some of the problems mentioned above, it was decided to place small computer systems at every cockpit and at each piece of equipment. These "smart" interfaces would offload the computations and input-/output operations from the mainframe system. This would leave the mainframe system free to do more work on the simulation programs themselves. However, the mainframe system must still have some method for communicating with these "smart" interfaces. It was decided that a digital, real time, standard Local Area Network (LAN) would be employed to handle communications. This in itself presented several problems. One was that not all of the "smart" interfaces would be identical systems and many of them had no "off the shelf" interface to a LAN. Also, the "off-the-shelf" interfaces that were available were usually not meant to be used as interfaces to a real-time LAN. Because of this, the software overhead used to invoke communications was often too slow to meet the real-time requirements.

It was desirable to have a network interface module that could be easily connected to any computer and not be dependent on any one system or one type of computer bus. It would also meet all standards for transmission and reception of frames of data, and would be able to transmit and receive these frames of data fast enough to meet the real-time requirements. This meant that the software to invoke communications with the interface module had to be the bare minimum necessary to get a block of data back and forth between the "smart" interface and the mainframe system.

United States patents of interest include U.S. Pat. No. 4,280,285 to Haas, which shows in FIG. 1 an interface circuit 72 for connecting an master controller 74 to a memory 70 and computer 68. The interface is used in conjunction with an aircraft simulator 50 having a cockpit 52. The signals pass through an instructor station 76 which as described in the patent, is capable of handling up to eight cockpits. Donahue et al in U.S. Pat. No. 4,144,550 show a system with a master interface 4 for connecting a master controller 2 to a passive area controller 6 and an active area controller 12. Daly et al in U.S. Pat. No. 4,071,887 is directed to a bidirectional interface for synchronous data interchange. The patented system allows data transfer between serial data channels and the parallel bidiredctional data bus of a microprocessor. U.S. Pat. No. 3,988,716 to Anderson is concerned with an interface logic circuit which permits the transfer of information between two computers which permits the transfer of information between two computers having asynchronous clocks. Munter in U.S. Pat. No. 4,154,985 discloses an interface circuity for coupling a data signal from one digital telephone facility, operating at one data rate, to another dlgital telephone facility operating at another data bit rate. The patented interface circuit includes storage and a frequency converter. Suhonick in U.S. Pat. No. 4,549,275 shows a graphics data handling system wherein a work station cooperates with a host computer which stores a list representation of complex three dimensional structure. Schwan et al in U.S. Pat. No. 4,604,682 disclose a buffer system for interfacing a data processor to a communications system using a buffer memory for storing input and output data. However, none of these references teach how to solve the problem of providing an interface circuit for matching a real time cockpit display graphics processor to a minicomputer.

SUMMARY OF THE INVENTION

An object of the invention is to provide interface apparatus an method of operation to implement a real-time Local Area Network.

The invention relates to a interface module and associated software for connecting a broad range of computer systems to a transceiver of a real time local area network. It connects to a host computer system that needs only to use parallel data input/output ports in order to communicate with the module. Hardware on the interface module accomplishes transmitting data to and receiving data from the local area network, all these transfers of data being via a buffer memory. The interface module is capable of transmitting and receiving serial data at a rate of ten megabits per second, can store approximately 14 kilobytes of this data internally in the buffer memory, and can then transfer the data to or from a host computer system at a rate of 16 bits every 719 nanoseconds. A graphics processor is used to drive real-time graphics displays in the cockpit of a simulator and the module of this invention interfaces the graphics processor to a minicomputer.

The interface module includes communications means including a controller unit coupled via a serial interface chip to the transceiver for transmitting information to and receiving information from the local area network.

The buffer memory has bus means comprising an address bus and data bus for parallel input of addresses and parallel input and output of data. A controller interface unit provides for two-way parallel transfer of addresses and data between the controller and the bus means. A host interface unit provides for two-way parallel transfer of addresses and data via a host line between the host computer and the bus means. Memory read and write lines are connected from the controller and also from the host interface unit to read and write control terminals of the memory.

A bus control unit includes a bistable device having a controller state and a host state. Coupling from the bistable device to the controller interface unit, to the host interface unit and to the host computer indicates the current state of the bistable device. A connection from the controller to a hold input of the bus control unit is used to set the bistable device to the controller state. A hold-acknowledge gate with inputs from the hold input and the bistable device and an output to the controller provides a hold-acknowledge signal indicating that the controller has access to the bus. A connection from the host computer to a bus request input of the bus control means is used to set the bistable device to the host state.

The controller interface unit comprises a set of address latches coupled to the controller and a set of outputs coupled to the address bus, and data buffers coupled between the controller and the data bus for parallel transfer of data in either direction, the address latches having a strobe terminal coupled to the controller for a signal from the controller to latch an address from the controller, and the data buffers having a direction-control terminal coupled to the controller for a signal from the controller to determine the direction of transfer. When the bus control unit is in the controller state the controller using signals on the memory read and write lines may selectively transfer data into and out of the buffer memory.

The host interface unit includes a set of address counter/latches having inputs coupled to the host line and a set of outputs coupled to the address bus, host data buffers coupled between the said line and the data bus for parallel transfer of data in either direction, and a set of type/direction control lines includinq a peripheral-write-address line, a peripheral-write-data line and a peripheral-read-data line. The type/direction control lines are coupled to receive signals from the host computer for controlling the host interface unit. The host data buffers have a direction-control terminal coupled to one of the type/direction control lines to determine the direction of transfer.

A synchronization unit includes a data-acknowledge circuit having a data-synchronization-strobe input coupled to the host computer and an input connected to the peripheral-read-data line. The data-acknowledge circuit is responsive either to a given signal condition at the data-synchronization-strobe input or to a change to a active condition on the peripheral-read-data line to provide a predetermined delay and then generate an acknowledge pulse on a data-acknowledge line coupled to the host computer. With an active signal on the peripheral-write-address line an address may be parallel loaded from the host line into the address counter/latches. In response to the given signal condition at the data-synchronization-strobe input and an active signal on the peripheral-write-address line, the synchronization unit generates write-enable signal on a peripheral-write-enable line. The peripheral-read-data line and the peripheral-write-enable line are coupled via host signal buffers to the memory read and write lines. When the bus control unit is in the host state the address/counter latches are enabled to supply address signals via the address bus to the memory the host data buffers are enabled for effectively coupling the host line via the host data buffers and the data bus to the memory, and the host signal buffers are enabled so that the host computer using signals on the peripheral-write-data line and peripheral-read-data lines along with the given signal condition at the data-synchronization-strobe input may selectively transfer data into and out of the buffer memory. In response to each occurrence of the given signal condition at the data-synchronization-strobe input, the address counter/latches operate as a counter to advance the address to consecutive locations in the buffer memory.

BRIEF DESCRIPTION OF THE DRAWING

FIG. 8 is a structure chart of the host software.

DETAILED DESCRIPTION

Figure 1:
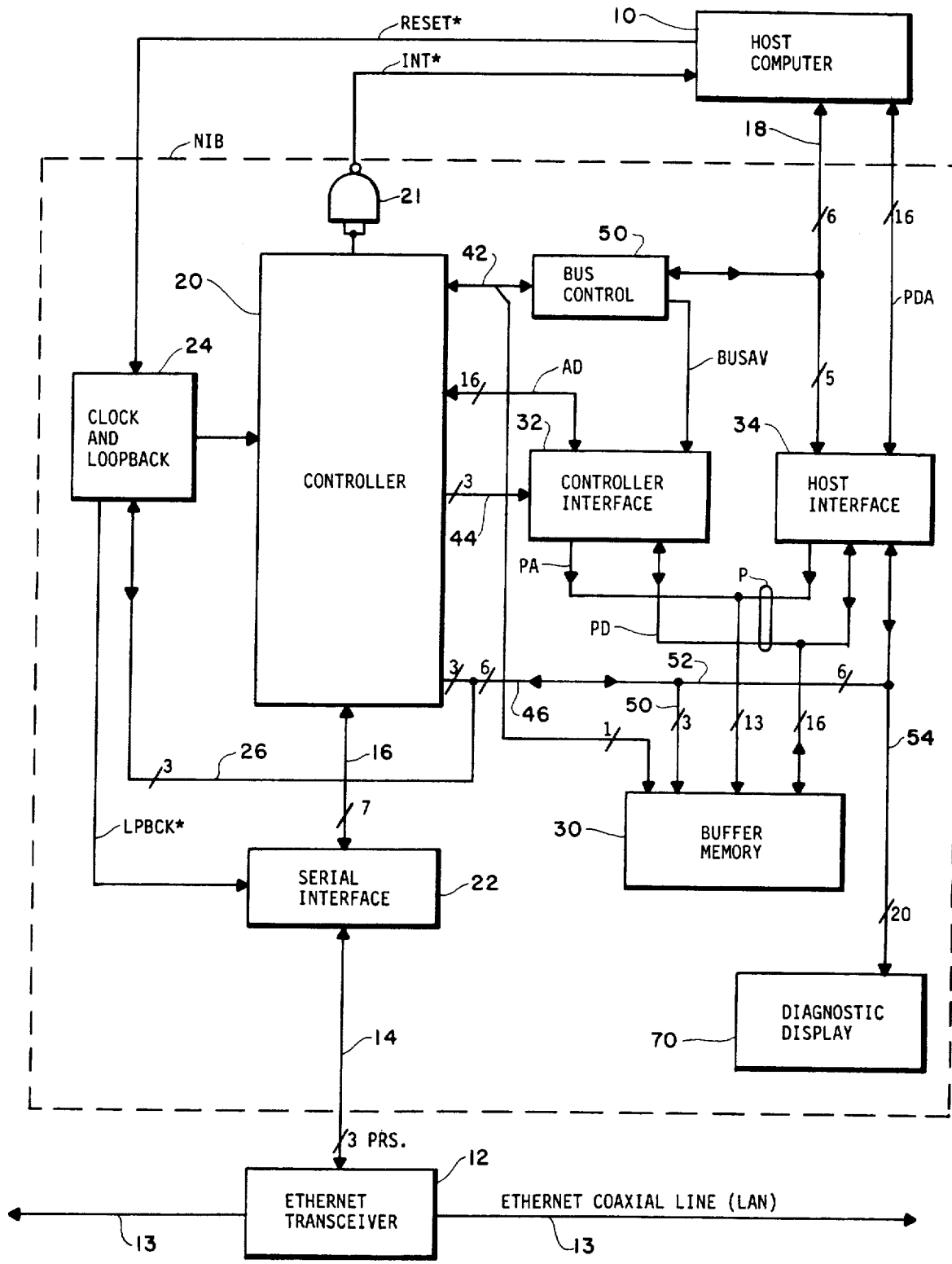
FIG. 1 is a block diagram showing a network interface board connecting a host computer to a transceiver of a local area network.

Referring to FIG. 1, a module for interfacing a host computer 10 to a local area network transceiver 12 is shown as a network interface board, wlth NIB used both as a reference character and hereafter as a short designation. The NIB is described in a thesis titled "Design of a Network Interface Board For a Real-Time Local Are Network" submitted by Richard Paul Benken, and Placed during the month of April, 1986 in the library at Wright State University, Dayton, Ohio. A copy of the thesis is included in the file of the application as filed, and is hereby incorporated by reference.

The local area network (LAN) to which the NIB interfaces meets Ethernet standards, and is used as a real time network. Real-time in this instance means that there will be no more than eight frames of data transmitted once every twenty milliseconds. Each of these frames will contain 500 bytes or fewer. Each NIB in the network will be responsible for receiving all eight frames. The NIB was designed for specific requirements of a flight simulation system, but is intended to be a generic controller that will interface to almost any host and work under almost any conditions.

In the following description, an asterisk is used at the end of any lead or terminal designation to indicate an active signal condition at the low logic level. On the drawing, the active low condition is shown on terminal designations by overlining, and on lead designations with an asterisk.

The NIB is centered around a controller 20, which interfaces with the transceiver 12 via a serial interface 22. All transfer of data between the controller 20 and the host computer 10 is via a buffer memory 30. The memory 30 interfaces with the controller 20 via a controller interface 32, and with the host computer 10 via a host interface 34. A clock chip and a loopback control device are shown as a block 24. The NIB also includes a bus control unit 50 and a diagnostic display 70. Two-Way 16-bit busses AD and PDA are used for the transfer of both addresses and data between the controller 20 and the interface 32, and between the host computer 10 and the interface 34 respectively. The address information is latched and supplied to the buffer memory 30 from either interface 32 or 34 via a 13-bit bus PA. The data is buffered and supplied to or from the memory 30 via a 16-bit bus PD.

Figure 2:
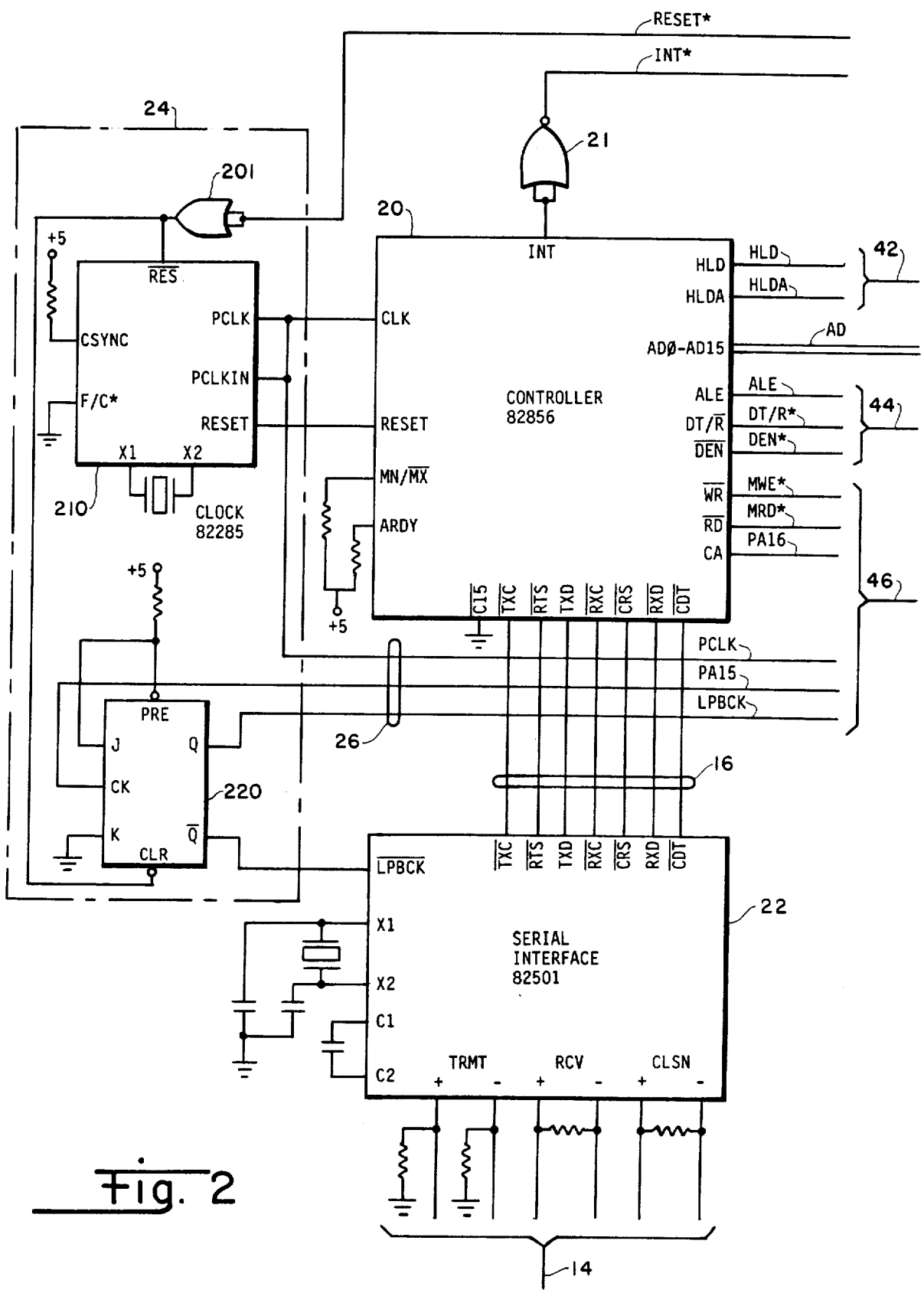
FIGS. 2 and 3 together comprise a more detailed block diagram of the network interface board.

The NIB is based around an INTEL Corporation chip set, as shown in FIG. 2. These chips are a type 82586 LAN controller 20, a type 82501 Ethernet Serial Interface 22, and a type 82285 Clock Generator 210 in block 24. To give a better understanding of the system, these chips will be briefly described.

The controller 20 transmits and receives frames of data to and from the LAN It receives and stores frames in the buffer memory 30. Frames to be transmitted are stored in the memory 30 by the host 10 and are removed and transmitted by the controller 20. This memory 30 is also used for the host 10 to control and communicate with the controller 20. The communication between the host 10 and the controller 20 occurs through this shared memory 30 because there is no I/O port access to the controller 20. The serial interface unit 22 takes serial data from the controller 20 and prepares it for transmission onto or reception from the LAN. It is connected directly to the oontrolled 20 and requires only an Ethernet transoeiver 12 (a line driver) to transmit and receive data to and from the Ethernet coaxial line 13. The clock chip 210 provides a special waveform clock signal necessary for the controller 20.

The buffer memory 30 must be large enough to contain eight maximum size Ethernet frames in a received frame area, one maximum size Ethernet frame in a transmit area, and a control/command area. This memory must be fast enough to allow the controller 20 to communicate with it a full speed without the insertion of wait states. This allows a maximum amount of time left over for the host to communicate with the buffer memory.

The NIB has three interfaces, (1) the controller 20 with the LAN transceiver 12, (2) the controller 20 with the buffer memory 30, and (3) the buffer memory 30 with the host computer 10.

For the first interface, the requirement is that the NIB needs only a cable to interface with an Ethernet transceiver. (The transceiver 12 is a line driver that buffers the data to and from the LAN (coaxial line).) Any necessary circuitry or components other than the Ethernet transceiver must be contained in the NIB.

The second interface, between the controller 20 and the memory 30, must allow the controller 20 to communicate with the memory 3o at its maximum rate without any insertion of wait states. This insures that a maximum amount of time is left over for the host 10 to communicate with the memory 30.

The third interface is between the host 10 and the memor 30. It should be noted once again that the host uses parallel data ports to communicate with the buffer memory. The interface should consist of 16 bi-directional data/address lines and no more than eight additional control lines. This keeps the number of data ports that the host will need to a minimum. The interface must also allow for handshaking during data and address transfers between the host and the NIB. This handshaking should inform the host or the NIB when new data or addresses are available on the data/address lines or when they have been removed from these lines and the next transfer can be started. Besides this handshaking, the host must have a means of gaining control of the memory 30 since both the host and the controller 20 use the memory. The controller 20 must always have top priority so it does not lose any frames of data being received from the network. When the host 10 tries to gain control, it must always know for certain whether or not transfers took place or if the controller 20 is blocking it off of the NIB system internal bus. Since the data/address lines are multiplexed, the NIB must be able to latch the address when it is supplied by the host.

Software is required to manipulate commands and data structures in the buffer memory 30 that the controller 20 uses. This software must accomplish three activities. The first is that of performing diagnostices that insure that the NIB is working properly. The second is that the host 10 will be able to transmit frames according to Ethernet standards onto the LAN. These frames should be able to be of varying sizes and be able to be transmitted to any or all NIBs on the LAN. Lastly, the controller 20 should be able to continuously receive frames without ever having to lose any. All frames, whether received with errors or without should be reported to the host. All software should be a bare minimum to get frames of data from one NIB of the LAN to another.

All of these requirements must be met for the NIB to be considered fully operational.

HARDWARE DESIGN

As shown in FIG. 2, the controller 20 is a type 82856 chip, designated as a Local Communications Controller, which is used to manage all frames that are transmitted to or received from the Ethernet Local Area Network (LAN). Once commanded to start by the host 10, the controller will automatically receive and store in the buffer memory 30 any frame from the LAN which is addressed to this particular NIB. All other frames will be ignored. While receiving frames, the controller automatically fetches buffers from the memory 30, links them together and notifies the host that a frame or frames have been received. Any frame received will be inspected for errors, stored in the memory 30 regardless of its condition and marked as either a good or bad frame. Transmission of a frame to any other NIB system on the LAN will also be possible. The controller 20 will remove data from the memory 30 and transmit it to any other NIB system on the LAN, once commanded to do so by the host. It will also perform diagnostics on all parallel and serial channels in itself and in the serial interface 22. Checks on the integrity of the Ethernet transmission cable can also be performed. The controller 20 removes most of the time consuming activities of running a network from the host 10. The chip 20 has terminals MN/MX* and ARDY connected via resistors to +5 volts.

It should be noted that the controller 20 communicates with the host 10 only through the buffer memory 30 and control lines. (No direct communication with the controller 20 is possible.) All commands and data to be transmitted are stored in the memory 30 by the host and retrieved from there by the controller 20. All received data is stored in the buffer memory 30 by the controller 20 and removed by the host 10.

The unit 22 is the Ethernet Serial Interface chip type 82501. This chip along with the Ethernet transceiver (which is a line driver for the Ethernet transmission cable) is used to create the interface between the NIB and the Ethernet LAN. The chip 22 converts the controller 20 single ended inputs and outputs to differential lines. It also does the Manchester encoding and decoding which is the Ethernet standard. Lastly, this chip provides the receive and transmit clocks for the controller 20. The chips 20 and 22 are connected via seven leads 16 between terminals having the same designation on each chip, e.g. CDT*, RXD, CRS*, RXC*, TXD, RTS*, & TXC*. On the controller chip 20, a terminal C15* is connected to ground. The serial interface chip 22 has terminals X1 and X2 connected to a crystal for frequency control and via capacitors to ground. A capacitor is connected to terminals C1 and C2. Three twisted pairs forming a cable 14 connect the serial interface chip 22 to the Ethernet transceiver 12. One pair and a resistor is connected across terminals CLSN and CLSN*, one pair and a resistor is connected across terminals RCV and RCV*, and one pair is connected to terminals TRMT and TRMT* with each lead having a resistor to ground.

A third chip 210 of the Intel set is the type 82285 Clock Generator for I/O co-processors. This chip, shown as part of the block 24 in FIG. 2, provides the special system clock for the controller chip 20. Its only other job is to synchronize the reset signal for the chip 20. The chip 210 has a terminal CSYNC connected via a resistor to +5 volts a terminal F/C* to ground, and terminals X1 and X2 connected to a crystal for frequency control. Terminals PCLK & PCLKIN are connected together and to the CLK terminal of the controller chip 20. The RESET terminals of the clock chip 210 and the controller chip 20 are connected together.

BUFFER MEMORY

Figure 3:
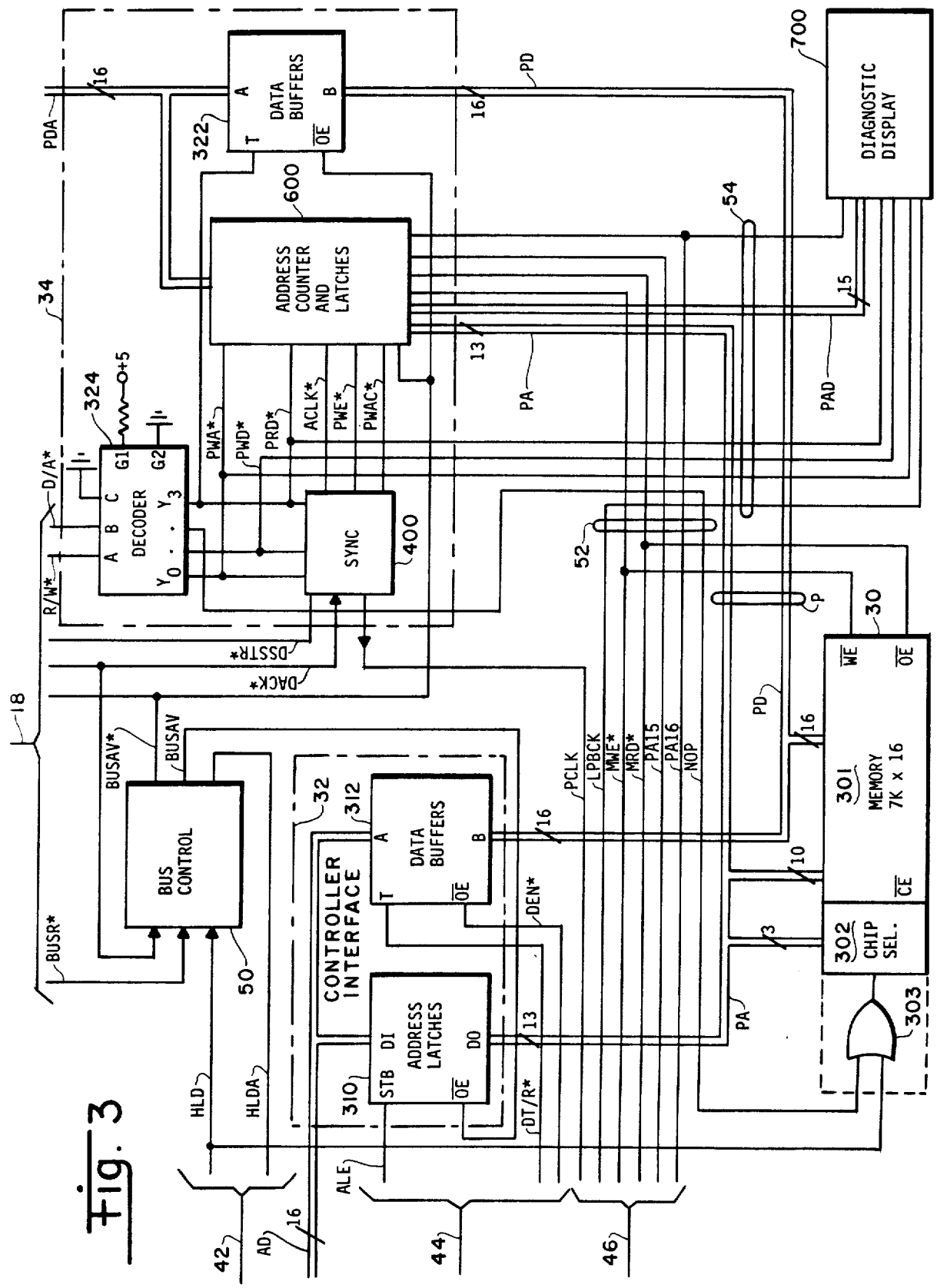

The buffer memory is shown in FIG. 3 as comprising a set of chips 301 for the memory storage, a chip select section 302. and an input OR gate 303. The requirements for amount of storage and speed of operation are presented in my thesis. The memory needs to be 16 bits wide to interface with the controller chip 20. The maximum size needed is 14,262 bytes. The memory chips 301 comprise Mostek MK4118-2K×8 static RAM chips used in pairs to obtain the 16-bit width with a maximum of seven pairs. These chips have address input terminals, 16 data terminals, a terminal WE* for write enable, a terminal OE* for output enable, and a terminal CE* for chip select. To select one of the seven pairs of memory chips, three additional address lines need to be decoded by a chip select device 302. This decoding is accomplished by a type 74KS138 three-to-eight line decoder. This chip can also be used to deselect all memory chips when they are not being used. The chip has terminals (not shown) A, B and C for the address input. Eight output terminals Y0-Y7, of which seven are used to supply the chip select signals to the memory pairs, a terminal G1 connected to the output of a type 74LS32 OR gate 303, and terminals G2A and G2B connected to ground.

It should be noted that every user's memory requirements will not be the same, and the memory size can be from 2048 bytes up to 16,384 bytes, with chips provided in pairs.

CONTROLLER INTERFACE

As shown in FIG. 3, the controller interface 32, between the controller 20 and the memory 30 comprises address latches 310 and data buffers 312. The address latches comprise two INTEL type 8282 tri-state latches. These chips latch the address, and can be disabled when not in use. The inputs DI are from the bus AD, and the outputs DO are to the bus pA, using eight bits on one chip and five bits on the other to provide the 13-bit address. The data buffers 312 comprise two chips INTEL type 8286 bi-directional tri-state buffers, each having their eight terminals A)-A7 (shown as A for the 16 terminals) connected to the bus AD and eight terminals B0-B7 (shown as B for the 16 terminals) connected to the bus PD, to provide the total of 16 bits. From the controller 20, control terminals ALE, DT/R* and DEN* are connected via leads shown as a line 44 to the controller interface 32, with line ALE connected to the strobe terminals STB of the address latches, and lines DT/R* and DEN* connected respectively to the terminals T and OE* of the data buffers 312. A control line BUSAV extends from the bus control unit 50 to the terminal OE* of the address latches 310. Memory write and read terminals WR* and RD* are connected via leads MWE* and MRD* of line 46 to the WE* and OE* terminals of the memory 30.

The controller 20 and its buffers for all address, data and control lines are to be disabled when not in use. The lines must only be enabled only when the controller 20 has control of the NIB system bus. The read and write control lines MWE* and MRD* coming directly from the controller 20 to the memory 30 are enabled internally to the controller 20 and need no further attention; however, the data and address buffers must be enabled by some external source. The address buffers are enabled by a line BUSAV from the bus controller 50 that is active whenever the controller 20 has taken control of the memory 30 The data buffers 312 are enabled via the line DEN* of the controller 20, which is active only when the controller puts data or expects data to be on the data lines AD0-AD15. These data buffers 310 are bi-directional and also need to be controlled directionally. This is accomplished by the DT/R* line of the controller 20, which selects the direction based on whether the controller 20 is reading or writing to memory.

HOST INTERFACE

The host interface 34 allows the host computer 10 to store commands and data in the memory 30 and also to retrieve data from the memory. The host 10 can access consecutive memory locations in the memory, without having to write a new address before every transfer This is accomplished by using address latches that act also as counters and automatically increment the memory address after each transfer. There are other control lines and signals, which are used to coordinate these transfers and help to communicate with the controller 20.

Figure 6:
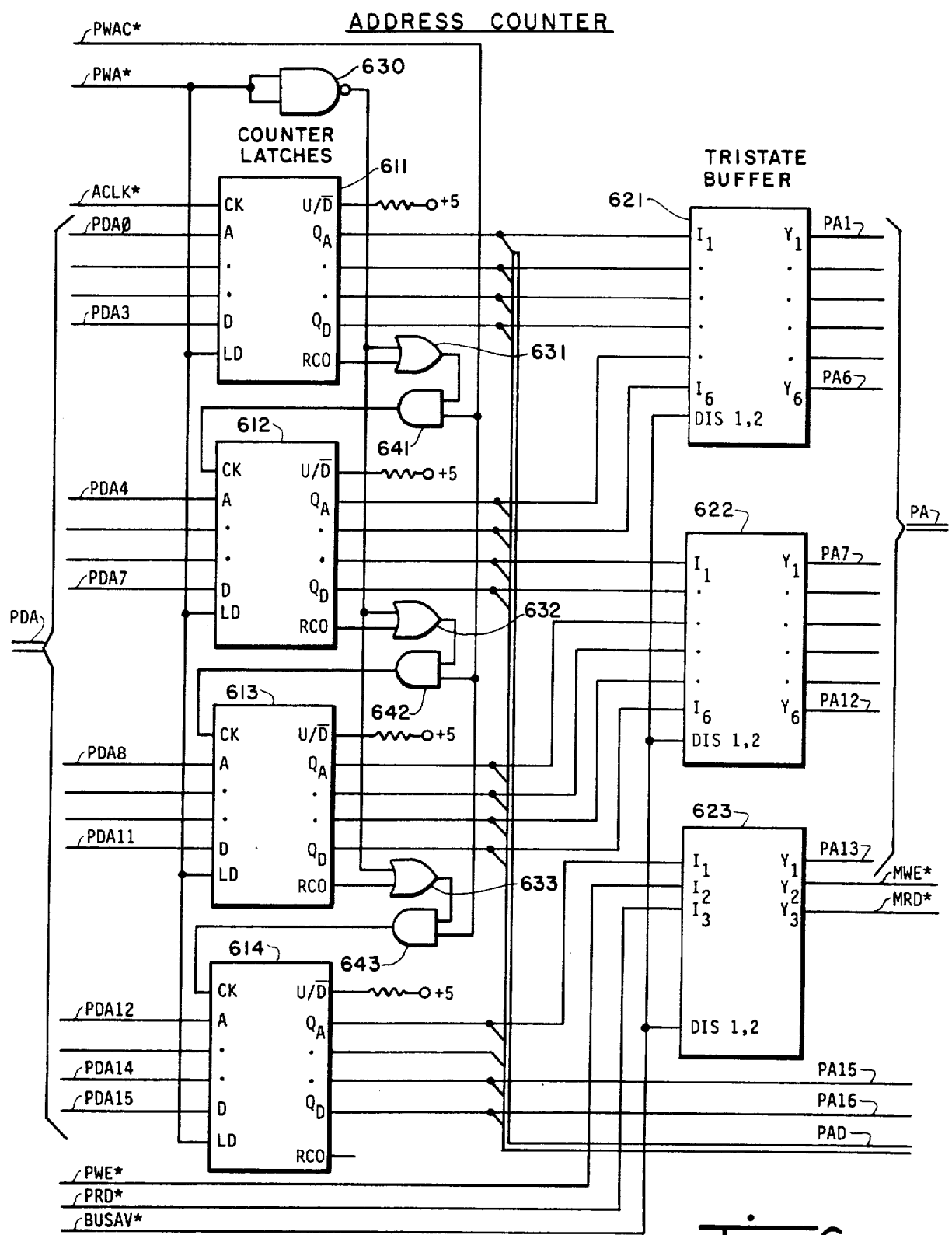
FIG. 6 is a functional block diagram of memory address counter/latches, for the host interface portion of the network interface board.

As shown in FIG. 3, the host interface 34, between the controller 20 and the host computer 10 comprises an address counter and latches unit 600, data buffers 322, a synchronization circuit 400, and a decoder 324. The address counter and latches unit is shown in FIG. 6, with its synchronization circuit 400 shown in FIG. 4. The data buffers 312 comprise two INTEL chips ty 8286 bi-directional tri-state buffers, each having their eight terminals A0–A7 (shown as A for the 16 terminals) connected to the lines of the bus pDA, and eight terminals B0–B7 (shown as B for the 16 terminals) connected to the bus PD, to provide the total of 16 bits.

The decoder block 324 provides information type/direction control lines for the host interface 34. These allow the host 10 to inform the NIB as to the type and direction of the information being transferred. The four cases possible are that the host is reading data from the memory 30, writing data to the memory, writing a memory address, or not using the memor 30 at all. These four cases are encoded onto two control lines R/W* (read/not write) and D/A* (data/not address) as set by the host. The block 324 comprises a type 74LS138 decoder chip. The two control lines R/W* and D/A* are connected to inputs A and B, with input C grounded, and outputs Y0–Y3 are used for the decoded signals on lines PWA*, PWD*, NOP and PRD* respectively (outputs Y4–Y7 unused). The terminals G1 and G2 are connected respectively to +5 volts via a resistor and to ground. The line PWA* for a write address signal is connected to the synchronization circuit 400, the address counter unit 600, and to the diagnostic display. The line PWD* for a write data signal is connected to the synchronization circuit 400 via a buffer in the address counter unit 600 to line MRD* and to the diagnostic display. The line NOP is connected to the OR gate 303 for the memory 30. The line PRD* for a write data signal is connected t the synchronization circuit 400 via a buffer in the address counter unit 600 to line MRD* and to the diagnostic display.

SYNCHRONIZATION OF DATA/ADDRESS TRANSFERS

Figure 4:
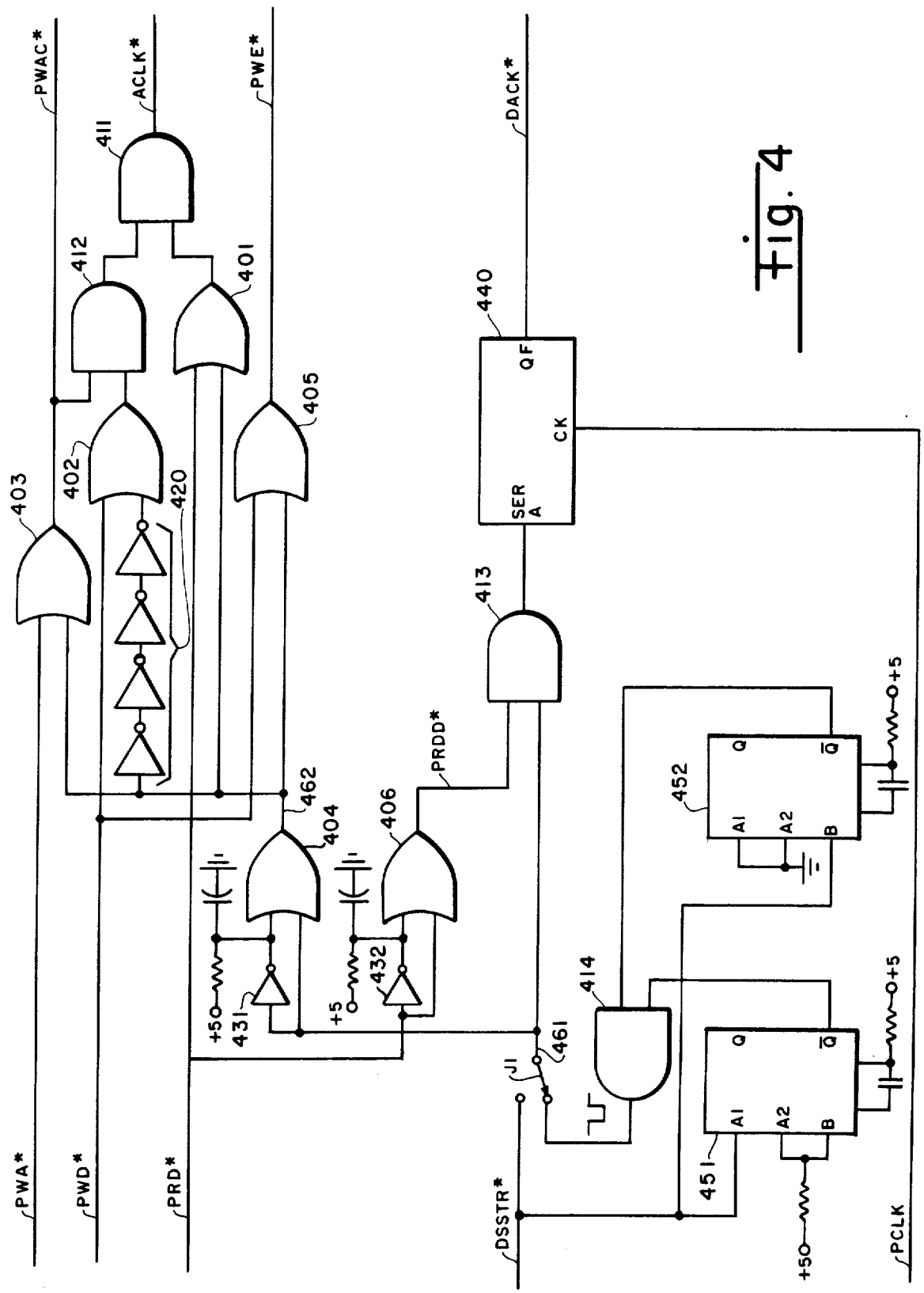
FIG. 4 is a functional block diagram of data/address synchronization circuitry for the host interface portion of the network interface board.

This section describes the handshaking circuits and operation for the synchronization of data and memory address transfers. The control lines to the host 10 include DSSTR* and DACK* (along with two others BUSR* and BUSAV*, described beloW in the "System Bus Control" section) which allow the host 10 and the NIB to know when one transfer is complete and the next is ready to start. The pulses used for this synchronization are used for generating many control signals used internally in the NIB. These signals control the entire data or address transfer process. The design is shown in FIG. 4.

The circuit includes six type 74LS32 OR gates 401–406, four type 74LS08 AND gates 411–414, a set of four type 7404 inverters 420 in tandem, two types 7505 open collector inverters 431–432, a type 74164 shift register 440, and two type 74121 "one shot" devices 451–452, along with bias and timing resistors and capacitors.

In order to synchronize a transfer when the host 10 is writing data, the host must first set the signals on the information type/direction control lines R/W* and D/A* to the write data mode. which will produce an active signal condition on line PWD*. Next, the host places tha data to be written on the bus PDA (external data/address lines) and asserts an active signal on line DSSTR*. When the data has been written into the buffer memory at the present memor address, and the address has been incremented to the next consecutive memory address, an active signal is asserted on the line DACK*. This informs the host that this transfer is complete and the next transfer can start immediately. This process must be used in conjunction with the processes for the host to gain control of the memory bus PA and PD in order to be certain the transter has occurred. The process can be repeated as long as the host wishes to write to consecutive memory locations.

The design to accomplish a write data transfer first involves producing a write pulse an a lead 461 in response to a signal on line DSSTR*. This can be done by one of two methods, depending an how a jumper J1 is connected. The first method has the connection of the jumper J1 directly from line DSSTR* to lead 461, in which case the host must provide an assertion pulse of at least 15o nanoseconds on line DSSTR*. The second method includes the "one shot" devices 451 and 452 in the circuit by connecting the jumper J1 from the output of AND gate 414 to lead 461, in which case the host need only invert the logic level on the line DSSTR* and the two devices 451 and 452 will provide a 150-nanosecond pulse. This allows more flexibility for the host in providing this control signal. Both of the devices 451 and 452 have external timing resistors and capacitors. Device 451 has input A1 connected to line DSSTR* and inputs A2 and B connected via a resistor to +5 volts, so that a negative going signal on line DSSTR* triggers generation of a pulse. Device 452 has input B connected to line DSSTR* and inputs Al and A2 connected to ground, so that a positive going signal on line DSSTR* triggers generation of a pulse. The Q* outputs of the devices 451 and 452 are connected to inputs of the AND gate 414, whose output is connected via the jumper J1 to lead 461 for the second method.

Control signals on line DACK* and other lines need to be created at the proper time for completion of a write transfer. The signal on line DACK* must never come before the entire transfer process is complete, which with worst case delays may require 429 nanoseconds. The lead 461 is coupled via AND gate 413 to the serial input of the shift register 440, which is clocked by the system clock at 8 MHz on lead PCLK. The QF output of the shift register is connected to line DACK*, with the write pulse from lead 461 delayed by at least 515 and not more than 719 nanoseconds. During this time other control signals must be generated, including signals on lines PWE* for peripheral Write Enable, and SYNC for incrementing the memory address to the next successive memory location.

A write enable pulse is created by shortening the pulse on line DSSTR* to no less than 60 and no more than 130 nanoseconds. This shortening is done so that the write transfer time is not dependent on the length of the pulse on line DSSTR* itself. The pulse shortening is accomplished by using the open collector inverter 432 with a resistor-capacitor network on its output, which is connected to one input of OR gate 404. The other input of gate 404 is directly from lead 461. The effect is that when the signal on lead 461 goes low at the beginning of a write pulse, the direct connection to gate 404 causes its output to go low. and the signal via the inverter 431 at the end of a delay produced by the R-C network causes the signal to return to the high state, thereby creating the write enable pulse on lead 462 at the output of gate 404. The lead 462 is connected as a input of OR gate 405, which also has an input from write data control line PWD*, so that when the signal o lead PWD* is low the write enable pulse is coupled to lead PWE* at the outPut of gate 405. As shown in FIG. 6, lead PWE* is connected to an input of a tri-state buffer, which is enabled whenever the host has control of the memory 30 The output from this buffer is coupled via lead MWE* to the write enable input of the memory 30 to start the write transfer. Lead 462 is also coupled via the four inverters 420 in tandem. OR gate 402, and AND gates 412 and 411 to the lead SYNC, to increment the counter/latches of circuit 600 to the next consecutive memory location. The four inverters insure that the data has been written into the memory 30 before the address begins to change. This completes a write transfer and the host will see a signal asserted on line DACK* after all this has been accomplished.

The next type of transfer that needs to be synchronized is the host writing a memory address to the NIB. For this transfer to occur, the host must first set the information type/direction control lines (at decoder 324 in FIG. 3) to the write address mode, which asserts a signal on lead PWA* (peripheral Write Address). Next, the host performs an arithmetic shift right operation on the address to be written to the counter/latches (as explained in a later section). The host then places this value on the 16-bit control line PDA (external data/address line) and a pulse on line DSSTR*. When the address has been loaded in the address/counter latches of unit 600, a pulse appears on line DACK* to acknowledge that the transfer has occurred. This process is identical to the write data transfer explained above.

The design in FIG. 4 to accomplish a write address transfer is identical to that for a write data transfer with two exceptions. The write enable pulse on lead 462 is blocked at gates 405 and 402 because the signal on the control line PWD* is at the inactive high state. Instead the signal on line PWA* is low, which enables OR gate 403 to pass the pulse from lead 462 to a Peripheral Write Address Control line PWAC*, and latch the new address in unit 600. The pulse is formed as described above for a write data transfer.

The synchronization of a read data transfer is much different from the write transfers. The host begins by setting the information type/direction control lines at decoder 324 in FIG. 3 to the read data mode, providing an active low signal on the Peripheral Read Data line PRD*. Now the host waits for the pulse on line DACK* to appear, signifying that the first word of data (at the memory location of the present address in the address unit 600) is valid on the 16-bit line PDA (external data/address line). The host must assert a pulse on line DSSTR* to read a second word of data at the next consecutive memory address. The next word of data is valid when a pulse appears on line DACK* again. This process must be used in conjunction with the processes for the host to gain control of the memory 30 in order to be certain that the transfer has occurred. These transfers can be continued as long as the host wishes to read consecutive memory locations.

The design in FIG. 4 to accomplish this read data transfer is partially the same as used in write data transfers in that a pulse from gate 413 is delayed by the shift register 440 to produce an acknowledge pulse on line DACK*. There are also many differences, the first of which occurs on the first read data transfer after the host sets the control lines to provide an active low signal on line PRD*. Usually the pulse on line DACK* is produced by delaying the pulse resulting from assertion of a signal on line DSSTR* but in this case no signal on line DSSTR* has been sent by the host. So to create a pulse on line DACK* in this instance, the signal on line PRD*, which goes low when the read data mode is initiated, is used to create a 150-nanosecond pulse on a line PRDD* at the output of OR gate 406, using a circuit with an inverter 432 and an R-C circuit like that used with gate 404. This pulse on line PRDD* is supplied via gate 413 to the shift register 440. After this first signal on line DACK* is received by the host, it can then read the word of data on line PDA. If the host wishes to read data in the next consecutive memory location, it needs only to place a signal on line DSSTR* and wait for an acknowledger pulse on line DACK*. At this point, the new word of data will be valid on line PDA. This can be continued as long as the host wishes to read data from consecutive locations in memory.

Another difference is that the pulse generated on lead 462 is supplied via gates 401 and 411 to the address clock pulse lead ACLK*, rather than being delayed via the inverters 420. The last difference is that the enable signal to the memory is from line PRD* via a buffer in unit 600 (FIG. 6) and line MRD* to the output enable input of the memory 30.

By using these methods of synchronization, the host will be able to successfully communicate with the NIB whenever it obtains control of the NIB system bus, as described in the following section.

BUS CONTROL

The bus control circuit 50 provides two methods by which the host 10 can gain control of the NIB system bus P. The host must fight for control of this bus with the controller 20 that also uses it to communicate with the memory 30; and must gain control before starting any read or write data transfers. It should be noted that memory address transfers can be made without having control of the bus. If either of the two methods are followed, the controller 20 will always be given high priority and will never lose any data due to the fact that it cannot obtain control of the bus.

Figure 5:
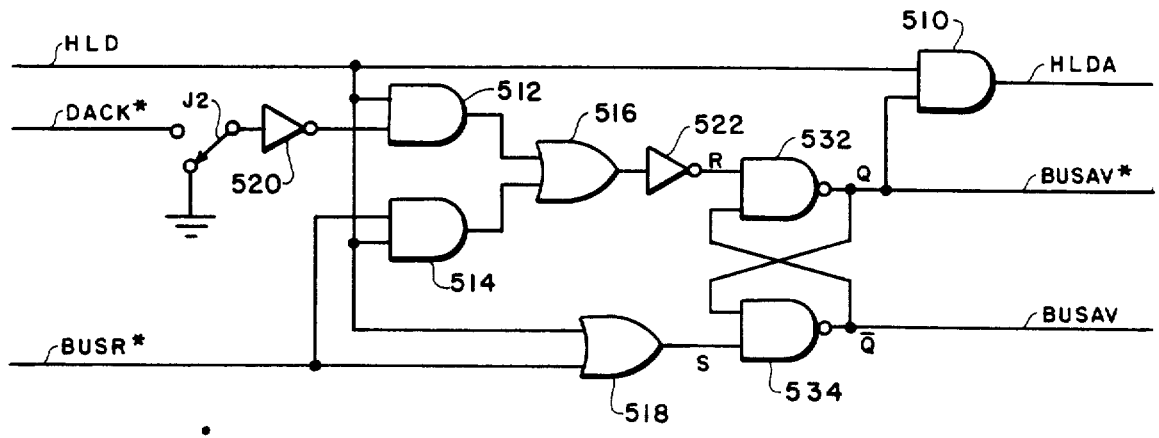
FIG. 5 is a functional block diagram of the system control circuit of the network interface board.

The circuit 50 is shown in FIG. 5. It comprises three type 74LS08 AND gates 510, 512 and 514; two type 74LS32 OR gates 516 and 518; two type 7404 inverters 520 and 522; and two type 7400 NAND gates 532 and 534. The NAND gates 532 and 534 have the output of each gate connected to an input of the other to form a set/reset latch for low logic levels. The "set" input is supplied via OR gate 518 having its output connected to an input S of gate 534. The "reset" input is supplied via AND gates 512 and 514 having their outputs connected to inputs of OR gate 516, whose output is coupled via the inverter 522 to an input R of gate 532. Note that the inputs of the latch at inputs S and R are both normally high, with the latch being set when the signal at S goes low, and reset when the signal at R goes low. When the latch is set with the signal on line BUSAV* low and that on line BUSAV high, then the host 10 has control of the bus. When the latch is reset with the signal on line BUSAV low and that on line BUSAV* high, then the controller 20 has control of the bus.

There are five signal lines that are used to implement the logic shown in FIG. 5 which need to be defined. The first is line BUSR* (Bus Request), connected to inputs of gates 514 and 518, which is asserted by the host 10 to signify that it desires control of the system bus P. A mate of this line is line BUSAV* (Bus Available), the output of gate 532, which tells the host that it has control of the bus. A line BUSAV at the output of gate 534 is the complement of line BUSAV* from the latch. The next is line DACK* (see the preceding section on Synchronization of Data/Address Transfers), which is optionally connected via a jumper J2 and the inverter 520 to an input of gate 512, to signal that the host's transfer is complete. The jumper J2 may connect the input of the inverter 520 to ground instead of to line DACK*. The last two lines are connected to the controller 20 and are internal to the NIB. One is line HLD (Hold), connected to inputs of gates 510, 512, 514 and 518. which means that the controller 20 requires the system bus. The other is line HLDA (Hold Acknowledge), at the output of gate 510, for a signal that the controller does indeed control the system bus. Gate 510 has its inputs connected to lines HLD and BUSAV*. The circuit in FIG. 5 implements the logic table below.

| | Bus Control Logic Table Logic levels at selected points | | | |
|---|---|---|---|---|
| BUSR* | BUSAV* | JUMPER J2 (DACK* or Ground) | HLD* | HLDA |
| 1. 1 | 1 | x | 1 | 1 |
| 2. 0 | 0 | x | 0 | 0 |
| 3. 0 | 1 | x | 1 | 1 |
| 4. 0 | 0 | 1 | 1 | 0 |
| 5. 0 | 1 | 0 | 1 | 1 |

(x = Don't Care)

Line 1 of the table shows that if the host 10 is not requesting the bus through a signal on line BUSR*, then the controller 20 will get the bus whenever it asserts a signal on line HLD. Line 2 shows that if the controller 20 isn't requesting the bus through a signal on line HLD, then the host will get control of the bus whenever it asserts a signal on line BUSR*. Line 3 illustrates the case of the controller currently using the bus and the host requesting it, in which case the host does not receive control of the bus while the controller is using it. Line 4 shows the case of the host having control of the bus and being in the middle of a transfer (i.e., a signal on line DACK* still unasserted), in which case the controller does not get control immediately, but must wait until the end of the transfer as is illustrated by line 5 of the table. Line 5 is the case of the host and the controller requesting control of the bus, but the host is either at the end of a transfer (i.e. a signal on line DACK* is asserted) or the jumper J2 has been tied to ground. In either case, the controller receives control of the bus immediately.

The first method of bus control for the host 10 to gain control of the bus has the jumper J2 connected to the line DACK*. This method imposes many transfer timing constraints on the host. It takes advantage of the fact that the controller 20 contains an internal 16-byte queue, and uses the time during which the controller is either not using the memory 30, or when it is working strictly with its queue, for the host to be transferring data in and out of the memory 30. The host first asserts a signal on line BUSR* and then waits for a signal on line BUSAV*. Whenever both lines BUSR* AND BUSAV* are low, the host must transfer data at the rate one transfer every three microseconds. If this rate cannot be maintained, the host must unassert the signal on line BUSR* or risk having the controller 20 losing frames of received data. As long as this rate is maintained, the controller 20 can, without losing data, take control of the NIB system. During the assertion of a low signal on line DACK*, as shown on lines four and five of the table. Before continuing with a transfer, the host 10 must check for a low signal on line BUSAV*, which is done on the tailing edge of the signal on line DACK*. When the host is completely finished with all transfers, the signal on line BUSR* must be unasserted within three microseconds.

The second method of bus control for the host 10 to gain control of the bus has the jumper J2 connected to ground. With this method, the host does not try to insure that as each individual transfer is accomplished it is accepted by the memory 30, but checks to see if a number of the transfers were accepted or not. If the transfers were not accepted, the host knows that the entire block of transfers must be completed again. With the jumper J2 grounded, the controller 20 can take control of the bus at any time, and line four of the table is not a valid case. In using this second method, the host first asserts a low signal on line BUSR* for at least 50 nanoseconds, and unasserts it before doing anything else. The host then checks line BUSAV*, and if the signal is high it continues these first two steps until it goes low. As soon as the signal goes low, the host 10 can transfer a block of data using only the control lines DSSTR* AND DACK*, and does not need to check line BUSAV* in the middle of making a block of transfers. At the end of the block of transfers, the host will inspect line BUSAV*. If the signal is low then all transfers are complete and correct, but if it is high then all transfers must be considered incorrect, because the controller 20 has gained control of the bus sometime during the transfer. The S-R latch of the bus control circuit 50 holds the signal on line BUSAV* high. Since there is no way to know which memory locations were affected, the entire block of transfers, including writing the starting address, must be repeated as soon as the signal on line BUSAV* goes low.

By using either of the two methods of bus control, the host will be able to successfully communicate with the memory 30. The user should choose a method which takes into consideration all aspects of the particular host and LAN being used.

EXTERNAL DATA/ADDRESS LINES

As shown in FIG. 3, the 16-bit external address/data line PDA is connected from the host computer 10 to the data buffers 322, and to the address counter and latches unit 600. The data buffers 322 comprise two type 8286 bi-directional tri-state buffers. These chips are disabled by a high signal on line BUSAV* at terminal OE* whenever the host does not control the memory 30. Their direction is controlled via lead PRD*, with a low signal while the host is reading and a high signal while writing.

BUFFER MEMORY ADDRESS COUNTER/LATCHES

The memory address/counter unit 600, shown in FIG. 6, comprises four type 74S169 counter/latch devices 611-614, and three type 8T95 tri-state buffers 621-623. The devices 611-614 are used to latch a memory address and to increment that address to the next consecutive memory location at the completion of each transfer. The sixteen leads PDA0-PDA15 of line PDA are connected in groups of four to the inputs A-D of these devices. The high-speed version is used to achieve the required minimum rate of one transfer every 800 nanoseconds. Line PWA* is connected to the input LD of each of the devices 611-614 for parallel loading of an address.

The latches are connected to provide an auto-incrementing counter, using a series of high-speed OR and AND gates to cascade the chips together. These gates are necessary in order for the counter/latches to pass the Ripple Carry Out (RCO) between them and also allow all of them to be loaded in parallel with an address. There are three type 74LS32 OR gates 631-633, and three type 74LS08 AND gates 641-643. A type 7400 NAND gate 630 is used as an inverter with an input from lead PWA* and an output connected to inputs of each of the three OR gates 631-633. Lead PWAC* is connected to an input of each of the three AND gates 641-643. The OR gate 631 has an input from terminal RCO of device 611 and an output to an input of the AND gate 641, whose output is connected to the input CK of device 612. In like manner, the gates 632 and 642 are connected between terminal RCO of device 612 and the terminal CK of device 613, and gates 633 and 643 are connected between these terminals of devices 613 and 614.

The outputs $Q_A-Q_D$ of the three counter/latch chips 611-613 are connected the inputs I1-I6 of the two buffer chips 621 and 622, and the output $Q_A$ of the chip 614 is connected to the input I1 of buffer chip 623, for the thirteen bits of an address. The ouputs Y1-Y6 of each of the two buffers 621 and 622, and the output Y1 of buffer 623 are connected to the address bus PA. Whenever the host has control of the memory 30, the buffers are enabled by a low signal on line BUSAV*, which is connected to the terminal DIS1,2 of each of the buffers 621-623.

The auto-incrementing of the address is accomplished by supplying a pulse on lead ACLK from the synchronization circuit 400 to the clock input CK of the first counter/latch 611, causing the counter comprising devices 611-614 to be incremented by one. The fact that the counter is incremented only by one creates a problem, however. Since this buffer memory is 16 bits wide, the memory address must be incremented by two because each transfer involves two bytes. In order to take care of this problem, the host must do one arithmetic shift right (putting a zero in the most significant bit) to the memory address before it is loaded into the address counter/latches. Now, when the counter/latches are auto-incremented by one it has the effect of incrementing the memory address by two. The least significant bit is not used to address the memory 30. This conversion of shifting right an address before writing it to the counter/latches must be accomplished for every address.

Using this method of writing addresses leaves two open address lines PDA14 and PDA15 on the most significant counter/latch chip 614, which are used as internal control lines. The outputs $Q_C$ and $Q_D$ of the chip 614 are connected directly to leads PA15 and PA16 without buffering. The inputs I2 and I3 of the buffer 623 are used for the leads PWE* and PRD*, with the outputs Y2 and Y3 connected to leads MWE* and MRD*.

Since the address lines PDA14 and PDA15 are used for special purposes, the highest address that is used for the memory 30 is 3FFEH (the H signifies a hexadecimal number). No higher address should be written to the counter/latches 611-614 unless using the special functions. Note that this address in binary form is 11 1111 1111 111x, which after shifting right appears on leads PDA12-PDA0 of the line PDA, and lines PA13-PA1 of the bus PA, with the x indicating a lead PA0 that is not needed.

CHANNEL ATTENTION CONTROL LINE

The line PA16 in FIG. 6 is the Channel Attention control line, which as shown in FIG. 2, is connected to terminal CA of the controller chip 20. This line is pulsed by the host to signal the controller that it has placed commands or data in the memory 30. The controller 20 responds by inspecting the memory and accomplishing any commands which the host has placed there. This is the only method for the host to directly affect the controller. A pulse on line PA16 is sent using the unused address line PDA15 to the counter/latch 614. It is asserted by writing 1000H as an address (which after shifting right is 1000 0000 0000 0000 on line PDA). Immediately after writing this address, some other address between 0000 and 3FFEH must be written to the counter/latches 611-614. This will pulse the Channel Attention control line PA16.

LOOPBACK CONTROL LINE

The line PA15 in FIG. 6 is the Loopback control line, which as shown in FIG. 2, is connected to the clock terminal CK of a type 74109 J-K flip-flop 220 in block 24. The Q* output of the flip-flop is connected to terminal LPBCK* of the serial interface chip 22. Line PA15 is used to put the serial interface 22 into its diagnostic loopback mode. In this mode the interface chip 22 immediately echoes back an frame of data transmitted to it by the controller 20. This allows the host 10 to insure that the serial interface 22 is operating properly. In order to assert the loopback line, the address 8000H (which after shifting right is 0100 0000 0000 0000 on line PDA), is written to the counter/latches 611-614 followed by writing some other address between 0000 and 3FFEH. To unassert the line, the same procedure is followed a second time. The loopback is automatically initialized to the non-loopback mode by reset signal to the CLR input of the flip flop 220. The flip-flop is connected in its toggle mode. The first time that the address 8000H is written and removed on line PDA, the flip-flop 220 will toggle to the loopback mode. If this address is written and removed a second time, the flip-flop will toggle to the non-loopback mode. This toggling of the flip-flop can continue indefinitely.

INTERRUPT CONTROL LINE

As shown in FIGS. 1 and 2, a terminal INT of the controller chip 20 is coupled via a type 7400 NAND gate 21 used as an inverter, and via a line INT* to the host computer 10. This line is the means by which the controller 20 can signal the host 10 that it requires the host's attention. The controller asserts a low signal on line INT* upon command completion, reception of frames and during initialization. The host clears it by writing the proper data in the memory 30 and pulsing the Channel Attention control line PA16.

RESET CONTROL LINE

As shown in FIGS. 1 and 2, a line RESET* is connected from the host 10 to a type 74LS OR gate 201 used as a buffer in the block 24, and thence to input RES* of the clock chip 210, and also to the input CLR of the flip flop 220. Its first purpose is to bring the controller 20 to a predetermined state so that it can be initialized. After the host 10 pulses the line RESET* low for at least 650 nanoseconds, the controller will internally ready itself for initialization. Then the host must write the proper initialization data into the memory 30, and then pulse the Channel Attention control line PA16. The second purpose of the reset control line is to set the serial interface 22 to its non-loopback mode by clearing the flip-flop 220. Note that the clock chip 210 is the clock generator for the controller 20, but it also synchronizes the reset pulse and applies it to the input terminal RESET of the controller 20.

DIAGNOSTIC HARDWARE

Figure 7:
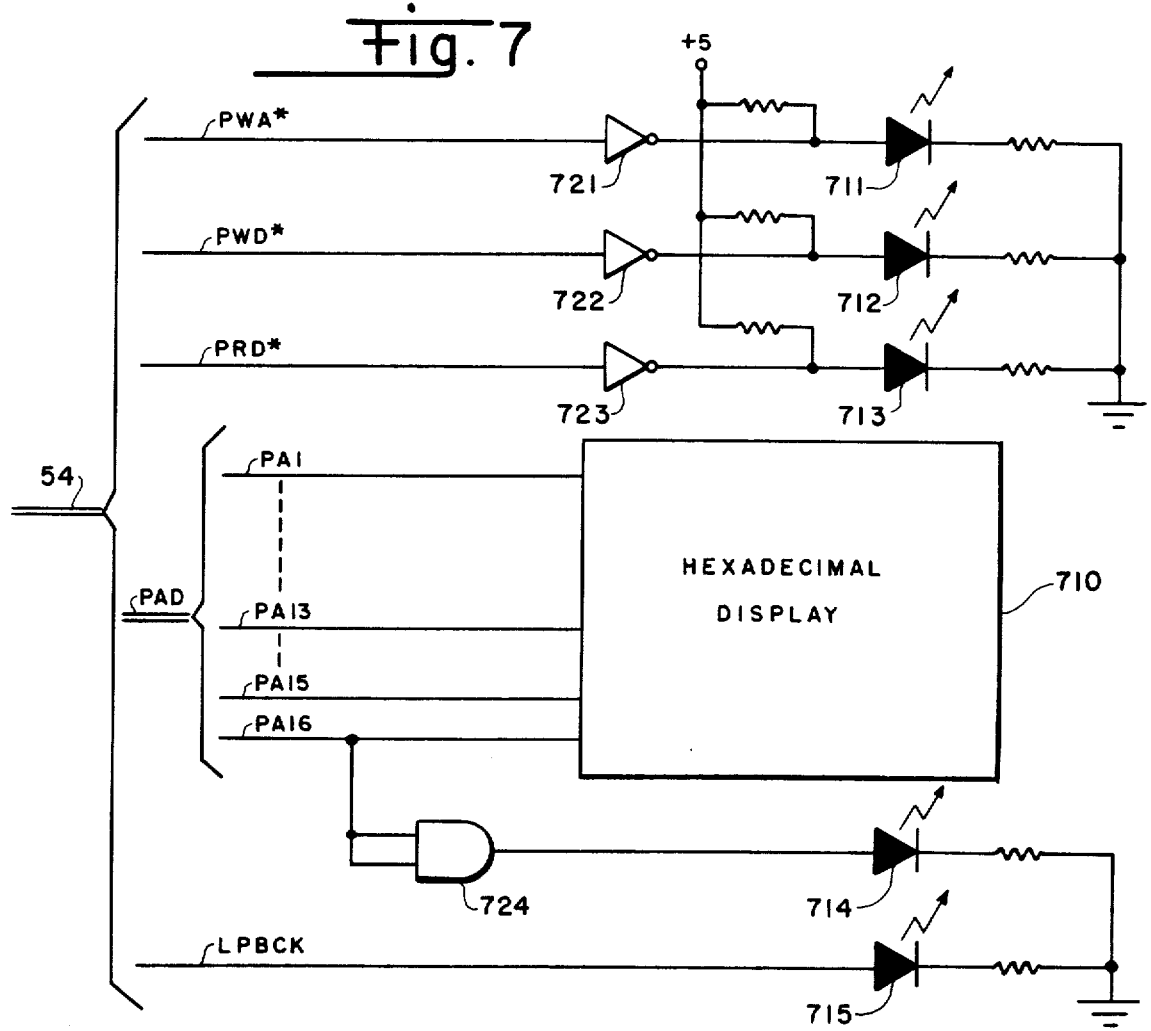
FIG. 7 is a functional block diagram of diagnostic hardware displays for the network interface board.

The diagnostic display 70 shown in FIG. 7 is necessary for the user to insure proper operation of the host interface 34. This hardware is used no real-time and must be visually inspected by the user. In includes a hexadecimal display 710 connected via the peripheral address display line PAD to the outputs of the counter/latches 611-614, and LED's (light-emitting diodes) 711-715 coupled to selected control lines. The address display is used by writing a memory address to the counter/latches 611-614 and insuring that it was properly latched. The user can then pulse line DSSTR* and insure that the address is being properly incremented. The LED's 711-715 all have their cathodes connected via resistors to ground. The LED's 711, 712 and 713 have their anodes connected via resistors to +5 volts, and also via type 7405 inverters 721, 722 and 723 respectively to lines PWA*. PWD and PRD*. The LED 714 is conneced via a Type 74LS08 AND connected used as a buffer to the Cnannel Attention control line PA16, and the LED 715 is connected to the loopback line LPBCK. The LED's will light whenever signals are asserted on the corresponding control lines. The user should, on a non real-time basis, assert each line one by one and visually inspect the LED for proper operation. If the user couples this inspection along with software diagnostics, any problem with the system can be readily identified.

SOFTWARE DESIGN

This section will describe the design of the software that the host will use to control the NIB. This software will implement a real-time Ethernet LAN along with diagnostics to check the entire system.

Since the software is based upon the INTEL 82586, a description of how it works will first be given. Following this description will be a complete explanation of the software necessary to control it.

CONTROLLER OPERATIONS

This section will give a description of the manner in which the 82586 (controller 20) operates. Since this describes the inner workings of a patented INTEL chip, this information must come directly from the INTEL 82586 Reference Manual, rewritten to contain only information pertinent to this project, with permission from the INTEL Corporation.

The 82586 controls all communication to and from the Ethernet LAN. It is controlled by the host using the NIB buffer memory to communicate with it. The 82586 is internally broken into two independent controllers; the command unit and the receive unit. The command unit accomplishes commands that the host places in the buffer memory. It also transmits all data onto the Ethernet LAN. The receive unit processes and stores all incoming frames of data from the Ethernet LAN that are addressed to this particular NIB. It insures that only frames addressed to this NIB are stored in the buffer memory. For the host and the 82586 to communicate through the buffer memory, this memory is broken into data structures. These data structures allow the host and the 82586 to keep straight what areas are used for control and transmit data, and what areas are used for received data. These data structures can be seen in FIG. 17. An explanation of these and how the host and 82586 manipulate them follows.

SYSTEM CONTROL BLOCK (SCB)

The system control block (SCB) is a portion of memory that the 82586 and the host share in order to communicate. The host can place commands here and then assert the channel attention control line. This will signal the 82586 to inspect the system control block and retrieve all the given commands. These commands control the operation of the command unit, the receive unit and acknowledge interrupts from the 82586. The control of the command unit and receive unit are merely a matter of telling them to start. Once started, the command unit fetches commands from the command block list (CBL) and does all the commands in the list one at a time until the end of the list is found. The receive unit, when started, will receive frames of data and store them in the receive frame area until it runs out of buffers to store them in. The 82586 will set its "interrupt" (INT*) line after accomplishing all commands in the command block list or after receiving a frame.

Command Unit Operation

Control of the 82586, except for reception of frames, is accomplished through the command unit. The system control block (SCB) contains the address of the command block list (CBL). This is a linked list of command blocks (CB) that the host wants the 82586 to accomplish. The 82586 will execute these commands one at a time until it finds the command block marked as the end of the list. When the 82586 finishes a particular command block, it will mark it as completed and also as to whether it was completed successfully or not. The 82586 will interrupt the host when the command block list is completed. There are a variety of commands that can be accomplished by the 82586, including transmission of buffers.

ACTION COMMANDS

These are commands that can be linked together in the command block list (CBL):

1. Individual Address Set Up

This command allows this 82586 to be given a specific address so that another 82586 can communicate specifically with this one. This address will also be inserted into outgoing data frames by this 82586 so that others will know where the frame originated.

2. Configure

This command is used to change the operating parameters that the 82586 will work with. The chip defaults to Ethernet standards. This command must be used to implement diagnostics using internal or external loopback. Loopback allows frames to be immediately sent back to the 82586 after being transmitted.

3. Multicast Address Set Up

This command gives the 82586 an address that will allow it to accept a frame that is sent out from another 82586 with a multicast address as its destination. A multicast address allows several NIB's to receive the same frame of data. This address will not cancel the individual address. Also, broadcast addresses are still possible. These allow a frame of data to be sent to all NIB's on the network.

4. Transmit

This command allows the transmission of a frame of data to any other 82586 whose address is known. The command consists of the destination address, the type of data that this frame contains and a pointer to the first transmit buffer descriptor (TBD). This transmit buffer descriptor is associated with one transmit data buffer (TDB). The transmit data buffer will be fetched and transmitted by the 82586 to form a frame. This frame along with address and type information is transmitted onto the LAN.

5. Time Domain Reflectometer (TDR)

This command performs a test of the Ethernet cable itself, by transmitting a frame and examining the response. This command will respond with: no problem, transceiver problem (frame never made it past the Ethernet transceiver) open found on the cable or short found on the cable.

6. Diagnose Command

This command tests all internal counters and timers of the 82586. It will respond with a pass/fail message.

RECEIVE UNIT OPERATION

Reception of frames is accomplished through a receive unit which is independent of the command unit. The system control block (SCB) contains the address to the receive frame area. This address then links the receive unit to a receive frame area. This link points to the first receive frame descriptor (RFD). which is associated on a one-to-one basis with a received frame. In turn, this receive frame descriptor (RFD) has a link to a receive buffer descriptor (RBD). Each receive buffer descriptor is associated with one and only one receive data buffer (RDB) which is where the actual frame of data will be stored. These receive data buffers can be of varying lengths to fit the user's needs. The 82586 will link as many receive buffer descriptors (and thereby the associated receive data buffers) to a receive frame descriptor as it takes to store an incoming frame of data. This allows the user to make the data buffers less than the maximum size of a frame. By making these buffers smaller, more efficient use of memory can be accomplished. This efficiency comes into play when frames of varying sizes are being received, allowing smaller frames to be located in only one of two buffers and larger frames in many buffers.

The receive unit itself can be in one of two states: no resources, and ready. The host can control and read the status of the receive unit through the system control block (SCB). During normal operations, the receive unit should be in the ready state. If it is in the no resources state, then frames cannot be received and will be lost. The no resources state is reached when the host has not emptied buffers fast enough to keep up with the amount of incoming data. When a frame is received, the 82586 will assert the INT* control line and set flags in the system control block status word signifying a frame has been received.

When a frame has been received, the host must inspect the first receive frame descriptor to determine if it has been used to receive a frame. If this receive frame descriptor has been used (this is determined by inspecting the receive frame descriptor status word), then the link to the first receive buffer descriptor must be recovered. This receive buffer descriptor contains a link to the used receive data buffer along with a count of how many bytes of valid data are in the buffer. This receive data buffer's valid data must now be read. The receive buffer descriptor must also be inspected for the end of file bit, that signifies if there is another buffer descriptor (and therefore another data buffer) associated with this frame. If this receive buffer descriptor is not the last one involved with this frame, then the host must retrieve the link to the next receive buffer descriptor. But before moving on to the next buffer descriptor, the first word of this receive buffer descriptor must be cleared to make this buffer descriptor (and its associated data buffer) free for use by the receive unit. This is useful because the link of the last receive buffer descriptor in the system has the address of the first receive buffer descriptor in the system, and this forms a cyclic list. This procedure for processing receive buffer descriptors and their associated receive data buffers is repeated until all data buffers associated with this receive frame descriptor have been read. At this time, receive frame descriptor can be cleared to free this descriptor for use with another incoming frame. As with the receive buffer descriptors, the receive frame descriptors are also chained together to form a cyclic list. The current receive frame descriptor contains the link address to the next receive frame descriptor. This next descriptor should be checked to see if it was used for a second frame. If this receive frame descriptor contains a second frame of data, this entire procedure should be repeated again. When an unused receive frame descriptor is used as the head of the list of frame descriptors the next time the 82586 receives a frame.

Now that the reader has a thorough understanding of what the 82586 and the host must do to transmit and receive frames, the software that will be run inside the host to control the 82586 can be explained.

MEMORY MAP

The software for this system works primarily by manipulating the data structures that were explained in the previous section. To access these data structures, the host must know where they are located in NIB buffer memory. This section will give an example of where they may be located, although (with one exception) they may be located anywhere the user chooses. The memory map in the Table is an example of possible choices for these locations. It is based on a 14-kilobyte buffer memory, 8 maximum size Ethernet frame receive frame area, and one maximum size frame Ethernet transmit frame area.

| NIB Buffer Memory Map | | |
|---|---|---|
| NIB Buffer Memory Address | Data Structure | Comment |
| 0800H through 080EH | SCB | System Control Block (14 bytes) |
| 0810H | CBL | Command Block List (100 bytes) |

-continued

NIB Buffer Memory Map

| NIB Buffer Memory Address | Data Structure | Comment |
|---|---|---|
| through 0874H | | |
| 0876H through 087CH | TBD | Transmit Buffer Descriptor (6 bytes) |
| 087EH through 036CH | TDB | Transmit Data Buffer (1518 bytes; immediately follows Transmit Buffer Descriptor) |
| OE6EH through OF1CH | RFD | Receive Frame Descriptor Area (8 RFD's at 20 bytes each) |
| OF1EH through 3EECH | RBD | Receive Buffer Descriptor and Receive Data Buffer area (8 RBD's of 8 bytes each with the 8 associated RDB's of 1518 bytes each. One RDB immediately follows each RBD) |
| 3FEEH through 3FF4H | ISCP | Intermediate System Configuration Pointer (6 bytes) |
| 3FF6H through 3FFEH | SCP | System Configuration Pointer (8 bytes; these must be located at these locations) |

Several items about the memory map deserve further explanations. The first item is that the system configuration pointer (SCP) must be located beginning at 3FF6H. The next is that transmit data buffers (TDB) and receive data buffers (RDB) are always located immediately following their respective transmit and receive buffer descriptors (TBD and RBD). There are no other restrictions on the memory map.

Now that the user knows where all of the data structures in the NIB buffer memory are located, the software to manipulate these can be explained.

STRUCTURE OF HOST SOFTWARE

This section uses a software design tool called a "structure chart" to help the reader visualize the structure of the software used to control the 82586. The software is run inside the host computer and is broken into eight subroutines or procedures that are shown in FIG. 8. The procedures themselves are shown as boxes. The boxes, or procedures, are connected by lines that denote what procedure called them. The procedures above call the procedures linked below them. The uppermost procedure 802, real-time communications is called by the main program running inside the host that wishes to communicate with other hosts through the Ethernet LAN. The name located outside of the boxes in FIG. 8 are parameters that are passed into or out of the procedure under them. The direction of these parameters is indicated by the arrow they are written next to.

The structure chart should be used as a "road map" that will help the reader understand how each of the software procedures found in the following sections are used.

PSEUDOCODE SOFTWARE PROCEDURE

This section formulates all necessary software procedures to implement an Ethernet LAN. The procedures allow transmission and reception of frames and performs a complete set of diagnostics.

The pseudocode procedures in this section are not written in any particular language, but are similar to Pascal. They should be used by the reader as a structured design of the software needed to control the NIB. They can be easily translated into any language that the host machine uses. Several of the commands used in these procedures are hardware-dependent on the NIB. By following the procedures outlined in the hardware design section, these commands are easy to use. However, a brief overview of these instructions will be given here.

1. RESETNIB—This instruction is used to bring the NIB system to a predetermined state. It is accomplished by:
   (a) Asserting the RESET* control line for at least 650 nanoseconds.
2. CHECKNIBINTERRUPT—This instruction is used to determine if the INT* control is asserted or not. It is accomplished by:
   (a) Inspecting the INT* control line.
   (b) Setting the variable INTERRUPT-FLAG to true if INT* was asserted and to false otherwise.
3. CA—This instruction is used to assert the channel attention (CA) line of the 82586. This line informs the 82586 that it should inspect NIB buffer memory because the host has stored commands or data there for it. It is accomplished by:
   (a) Writing the address 10000H to the NIB buffer memory address counter/latches 600.
   (b) Writing any other address between 0000 and 3FFEH to the NIB buffer memory address counter/latches.
4. PULSELOOPBACK—This instruction is used to set or clear the 82501 loopback flip-flop 220. The first time this instruction is executed it puts the 82501 into its diagnostic loopback mode. The second time, it puts the 82501 back into its normal mode. The process of toggling between normal and loopback mode can be continued indefinitely. It is accomplished by:
   (a) Writing the address 8000H to the NIB buffer memory address counter/latches 600.
   (b) Writing any other address between 0000 and 3FFEH to the NIB buffer memory address counter/latches.
5. WRITE—This instruction is used to transfer from the host data to certain memory locations in the NIB buffer memory. The data and the addresses it is to be sent to are immediately following the WRITE instruction. It is accomplished by:
   (a) Writing the starting address where the host wants to write into the NIB buffer memory address counter/latches.
   (b) Gaining control of the NIB system bus using the bus control lines (BUSR* and BUSAV*).
   (c) Setting the information type/direction control lines R/W* and D/A* to write data mode.
   (d) Making transfers using the bus control lines (BUSR* and BUSAV* and the data synchronization lines (DSSTR* and DACK*). If all data is not going to consecutive memory locations, this process must be repeated from the first step on for all of the non-consecutive memory locations. Y
   (e) Releasing control of the NIB system bus.
   (f) Setting the information type/direction control lines (R/W* and D/A*) to the not using buffer memory (NOP) mode.
6. READ—This instruction is used to transfer data from certain memory locations in the NIB buffer memory to the host. The addresses that are to be read immediately following the READ instruction. It is accomplished similarly to the WRITE instruction, except that this instruction reads instead of writes from NIB buffer memory. The data that is read must be stored somewhere in the host memory. This data will be referred to in the pseudocode procedures. The convention used in the procedures is that if a word of data is read from NIB buffer memory address locations SCB+2, then the data is stored in a host variable denoted by quotes (i.e.. "SCB+2").

If the user requires more detail about any of these instructions, the hardware design sections should be referenced.

Before listing the actual pseudocode procedures, several conventions that are used in these procedures should be explained.

1. Anything inside of parentheses-asterisk pairs is only a comment (i.e. (*Comment*)), and is not an instruction.

2. Any address inside of quotes (i.e., "SCB+2") refers to the data that was last read (using a READ instruction) from that location. An address not inside quotes refers to that actual NIB buffer memory address.

3. An "H" following any number means that that number is hexadecimal.

4. An "X" inside of a number means that this part of the number is inconsequential. For example, OAXXXH means that the host should be concerned about only the most significant byte of this hexadecimal number.

The following are the actual pseudocode procedures (or subroutines) that implement a real-time local area network. FIG. 8 should be used as a visual aid when reviewing this software.

---

Software Design

PROCEDURE REAL-TIME-COMMUNICATIONS 802 (PARAMETERS: START-FLAG, TRANSMIT-DATA-ADDRESS-TYPE-SIZE, TRANSMIT FLAG, INDIVIDUAL-MULTICAST-ADDRESSES, RECEIVE-FLAG, RECEIVE-DATA-ADDRESS-TYPE-SIZE, ERROR-FLAG, ERROR-BUFFER, NUMBER-RFD, NUMBER-RBD, RDB-SIZE):
(*********************************************************

This procedure 802 is called by the user's main program. It is used to:

1. Ready the NIB for communications
2. Check for received frames and remove any of them from NIB buffer memory
3. Transmit a frame of data to any other NIB on the network.

Parameters used by this procedure are:

1. Start-flag which is set by the user to signify that the NIB should be started or restarted.
2. Transmit-data-address-type-size which is an array that gives all necessary information to transmit a frame to another NIB. It is filled by the user.
3. Transmit-flag which is set by the user to signify that the transmit-data-address-type contains valid information.
4. Individual-multicast-addresses which are picked by the user and give this NIB its addresses to be used during communications.
5. Receive-data-address-type-size which are arrays and are filled with information that the NIB received from another NIB.
6. Receive-flag which is set so that the user knows when there is valid data in the receive-data-address-type-size array.
7. Error-flag which is set so the user is aware of a problem and knows that the error-buffer contains a valid message.
8. Error-buffer which is filled by the procedure which discovers the error and is used to notify the user of the cause of a NIB system failure.
9. Number-RFD which is filled by the user and determines the number of receive frame descriptors (RFD) that will be created by a procedure start-receive-unit. (Must be greater than one.)
10. Number-RBD which is filled by the user and determines the number of receive buffer descriptors (RBD) and the associated receive data buffers (RDB) to be created by procedure start-receive-unit. (Must be greater than one.)
11. RDB-size which is filled by the user to determine the size of the receive data buffers (RDB). It is given in bytes and must be an even number.
*********************************************************)

GLOBAL CONSTANTS:
SCB              (*This constant is the NIB buffer memory address that
                 points to the first word of the System Control Block
                 (SCB) and is set by the user*)
BEGIN            (*REAL-TIME-COMMUNICATIONS*)
ERROR-FLAG=FALSE  (*Initialize ERROR-FLAG*)
IF       (START-FLAG=TRUE)
         THEN  (*User wishes to start or restart NIB*)
               CALL START-UP
ENDIF
IF ERROR-FLAG=TRUE
         THEN  (*Error found during Start-up*)
               END    (*PROCEDURE REAL-TIME-COMMUNICATIONS*)
ENDIF
RECEIVE-FLAG=FALSE  (*Resets this variable which will be set if
                    a receive frame interrupt had been found*)
TRANSMIT-INTERRUPT=FALSE    (*Initializes this variable which will -continued Software Design

```
                            be used by other procedures*)
CHECKNIBINTERRUPT    (*This command checks the NIB interrupt line
                     and sets a variable called INTERRUPT based
                     on its findings*)
LOOP   WHILE  (INTERRUPT=TRUE)    (*Process all Interrupts*)
       READ
                      NIB Buffer
       Data Structure  Memory Address
       System Control  SCB + 0     (*System Control
       Block (SCB)                 Block Status word*)
       ENDREAD
       CASE    ("SCB+0") OF
       4XXXH   or
       5XXXH   or
       6XXXH   or
       7XXXH:  (*Interrupt signifying a frame has been received*)
               CALL RECEIVE-DATA (*Retrieve frame from NIB*)
       2XXXH   or
       3XXXH:  (*Interrupt signifying frame transmission was
               accomplished*)
               TRANSMIT-INTERRUPT=TRUE   (*Set variable so that Proce-
                                         dure Transmit-Data knows it
                                         was called*)
               CALL TRANSMIT-DATA (*Acknowledge Interrupt*)
               IF      (ERROR-FLAG=TRUE)
                       THEN (*Transmission error found*)
                       END  (*REAL-TIME COMMUNICATIONS*)
               ENDIF
       1XXXH:  (*Receive unit is losing frames because there are no
               empty buffers to store them in*)
               ERROR-FLAG=TRUE
               FILL ERROR BUFFER WITH "NIB SYSTEM FAILURE"
               END (*REAL-TIME-COMMUNICATIONS*)
       ENDCASE
       CHECKNIBINTERRUPT (*Reset INTERRUPT-FLAG variable*)
ENDLOOP
IF     (TRANSMIT-FLAG=TRUE)
       THEN (*User wishes to transmit a frame*)
       CALL TRANSMIT-DATA
ENDIF
END    (*REAL-TIME-COMMUNICATIONS*)
```

```
PROCEDURE START-UP 810 (PARAMETERS: ERROR-
BUFFER, INDIVIDUAL-MULTICAST-ADDRESSES,
ERROR-FLAG, NUMBER-RFD, NUMBER-RBD, RDB-SIZE):
(***************************************
This procedure 810 is used to initialize, run diagnostics on,
configure and start the receive unit of the NIB. It is called
when the user wishes to start the NIB initially or try to restart
it after a NIB system failure.
Parameters used by this procedure are:
1. Individual-multicast addresses which are used to
give this NIB its particular addresses used in communications.
2. Error-flag which is used to inform the user that an
error has occurred in the NIB system and that a valid message is
in the Error-buffer.
3. Error-buffer which contains messages telling the
user what caused the NIB system failure.
4. Number-RFD which is set by the user to determine the
number of Receive Frame Descriptors (RFD).
5. Number-RBD which is set by the user to determine the
number of Receive Buffer Descriptors (RBD) and associated Receive
Data Buffers (RDB) to be created.
6. RDB - Size which is set by the Receive Data Buffer
(RDB) in bytes (must be an even number).
***************************************)
BEGIN  (*START-UP*)
CALL INITIALIZE
(*This will ready the NIB system for taking commands and bring
it to a predetermined state*)
IF     (ERROR-FLAG=TRUE)
       THEN (*NIB will not initialize*)
                END   (*START-UP*)
ENDIF
CALL DIAGNOSTICS
(*This insures that the NIB is operating properly*)
IF     (ERROR-FLAG=TRUE)
       THEN (*NIB failed diagnostics*)
              END   (*START-UP*)
ENDIF
CALL CONFIGURE   (*This procedure establishes individual
                 and multicast addresses for this NIB*)
IF     (ERROR-FLAG=TRUE)
       THEN (*NIB won't accept addresses*)
              END   (*START-UP*)
ENDIF
CALL START-RECEIVE-UNIT  (*This procedure enables the
                         NIB to begin receiving frames*)
END    (*START-UP*)
```

```
PROCEDURE INITIALIZATION 820 (PARAMETERS:
ERROR-FLAG, ERROR-BUFFER):
(***************************************
This procedure 820 brings the NIB system to a predetermined
state and readies it to accept commands.
The parameters used by the procedure are:
1. Error-flag which signals the user that an error has
occurred and that the Error-buffer contains a valid error message.
2. Error-buffer which is filled with error messages to
inform the user what caused the NIB system failure.
***************************************)
GLOBAL CONSTANTS
SCB      (*This constant is the NIB buffer memory address
         that points to the first word of the System Control
         Block (SCB) and is set by the user*)
ISCP     (*This constant is the NIB buffer memory address
         that points to the first word of the Intermediate
         System Configuration Pointer (ISCP) and is set by
         the user*)
```

-continued

| BEGIN | (*Initialization*) |  |
|---|---|---|
| RESETNIB | (*Strobe reset control line which will bring the NIB to a predetermined state*) | |
| WRITE | (*Initialization Data*) | |

| Data Structure | Data | NIB Buffer Memory Address |
|---|---|---|
| System | 0000 | 03FF6H |
| Configuration | 0000 | 03FF8H |
| Pointer | 0000 | 3FFAH |
| (SCP) | ISCP+0 | 3FFCH |
|  | 0000 | 03FFEH |
| Intermediate | 0001 | ISCP+0 |
| System | SCB+0 | ISCP+2 |
| Configuration | 0000 | ISCP+4 |
| Pointer | 0000 | ISCP+6 |
| (ISCP) |  |  |
| System | 0000 | SCB+0 |
| Control | 0000 | SCB+2 |
| Block | 0000 | SCB+4 |
| (SCB) | 0000 | SCB+6 |
|  | 0000 | SCB+8 |
|  | 0000 | SCB+0AH |
|  | 0000 | SCB+0CH |
|  | 0000 | SCB+0EH |

ENDWRITE
CA   (*Alert the 82586 to begin the initialization*)
    CHECKNIBINTERRUPT   (*Set INTERRUPT-FLAG based on NIB "interrupt" control line*)
LOOP  WHILE  (INTERRUPT-FLAG=FALSE)
    WHILE
        CHECKNIBINTERRUPT
ENDLOOP
READ

| Data Structure | NIB Buffer Memory Address |  |
|---|---|---|
| System Control | SCB+0 | (*STATUS WORD*) |
| Block (SCB) |  |  |

ENDREAD
IF   ("SCB+0"≠0A000H)
    THEN  (*SYSTEM WILL NOT INITIALIZE*)
        FILL  ERROR-BUFFER WITH "NIB WILL NOT INITIALIZE"
            ERROR-FLAG=TRUE
ENDIF
(*This section acknowledges the interrupts that were received*)
WRITE

| Data Structure |  | Data | NIB Buffer Memory Address |
|---|---|---|---|
| System Control Block (SCB) | (*Acknowledging Interrupts*) | 0A000H | SCB+2 |

ENDWRITE
CA   (*Signal 82586*)
END  (*INTIALIZATION*)

---

PROCEDURE DIAGNOSTICS 822 (PARAMETERS: ERROR-FLAG, ERROR-BUFFER):
(*********************************************

This procedure checks all aspects of the NIB system by checking:

1. 82586 internal registers, clocks and channels,
2. 82586 serial communicating circuitry,
3. 82586 to 82501 serial communication link,
4. Ethernet transceiver and cable integrity.

Parameters used are:

1. Error-flag which signals the user that an error has occurred and that the Error-buffer has a valid error message,
2. Error-buffer which is filled with error messages to inform the user what caused the NIB system failure.
****************************************************)

GLOBAL CONSTANTS

CBL  (*This constant is the NIB buffer memory address for the first word of the Command Block List (CBL) and is set by the user*)
SCB  (*This constant is the NIB buffer memory address for the first word of the System Control Block (SCB) and is set by the user*)
TBD  (*This constant is the NIB buffer memory address for the first word of the Transmit Buffer Descriptor (TBD) and is set by the user*)
RFD  (*This constant is the NIB buffer memory address for the first word of the Receive Frame Descriptor (RFD) and is set by the user*)
RBD  (*This constant is the NIB buffer memory address for the first word of the Receive Buffer Descriptor (RBD) and is set by the user*)

CONSTANTS
RBDSIZE=0AH   (*Size by definition of a Receive Buffer Descriptor*)
TBDSIZE=08H   (*Size by definition of a Transmit Buffer Descriptor*)
BEGIN  (*DIAGNOSTICS*)
(*This section of code is a test that performs the 82586 Diagnose command to test 82586 internal channels and clocks*)
WRITE   (*This is the data to perform the diagnose command*)

| Data Structure |  | Data | NIB Buffer Memory Address |
|---|---|---|---|
| System Control Block SCB) | Start Command Unit | 0100H | SCB+2 |
|  |  | CBL+0 | SCB+4 |
| Command Block List (CBL) | Diagnose Command | 0000H 8007H | CBL+0 CBL+2 |

ENDWRITE
CA   (*Alert the 82586 to begin commands*)
CHECKNIBINTERRUPT   (*Set INTERRUPT-FLAG based on NIB interrupt control line*)
LOOP  WHILE  (INTERRUPT-FLAG=FALSE)

-continued

```
CHECKNIBINTERRUPT
ENDLOOP
READ
```

| Data Structure | NIB Buffer Memory Address | |
|---|---|---|
| Command Block List (CB) | CBL+0 | (*STATUS WORD*) |

```
ENDREAD
IF      ("CB"+0"=0A800H)
        THEN
                FILL ERROR-BUFFER WITH "82586 FAILURE"
                ERROR-FLAG=TRUE
                END    (*DIAGNOSTICS*)
(*This portion of diagnostics tests the serial I/O of the 82586 by
sending a frame of data to itself using its internal loopback
function. The data sent is stored in TDB+0 through TDB+3EH and
received in RDB+0 through RDB+3EH*)
TDB=TBD+TBDSIZE     (*TDB immediately follows TBD*)
RDB=RBD+RBDSIZE     (*RDB immediately follows (RBD*)
WRITE (*This data puts the 82586 in its loopback mode, starts the
receive unit and transmits a frame*)
```

| Data Structure | | Data | NIB Buffer Memory Address |
|---|---|---|---|
| System Control | (Start Receive Unit | 2110H | SCB+2 |
| Block (SCB) | and Command Unit) | CBL+0 | SCB+4 |
| | | RFD+0 | SCB+6 |
| Command Block | Configure Command | 0000 | CBL+0 |
| List (CBL) | (Set internal | 0002H | CBL+2 |
| | loopback) | CBL+A | CBL+4 |
| | | 0804H | CBL+6 |
| | | 4680H | CBL+8 |
| | Transmit Command | 0000 | CBL+0AH |
| | | 0004H | CBL+0CH |
| | | CBL+1AH | CBL+0EH |
| | | TBD+0 | CBL+10H |
| | | FFFFH | CBL+12H |
| | | FFFFH | CBL+14H |
| | | FFFFH | CBL+16H |
| | | 0000 | CBL+18H |
| | Configure Command | 0000 | CBL+1AH |
| | (Clear internal | 8002H | CBL+1CH |
| | loopback) | 0000 | CBL+1EH |
| | | 0804H | CBL+20H |
| | | 0600H | CBL+22H |
| Transmit Buffer | | 8040H | TBD+0 |
| Descriptor (TBD) | | 0000 | TBD+2 |
| | | TDB+0 | TBD+4 |
| | | 0000 | TBD+6 |
| Transmit Data | (Test data) | 0AAAAH | TDB+0 |
| Buffer (TDB) | | 5555H | TDB+2 |
| | | 0AAAAH | TDB+4 |
| | | 5555H | TDB+6 |
| | | 0AAAAH | TDB+8 |
| | | 5555H | TDB+0AH |
| | | 0AAAAH | TDB+0CH |
| | | . | . |
| | | . | . |
| | | . | . |
| | | 5555H | TDB+3EH |
| Receive Frame | | 0000 | RFD+0 |
| Descriptor (RFD) | | 0000 | RFD+2 |
| | | 0000 | RFD+4 |
| | | RBD+0 | RFD+6 |
| | | 0000 | RFD+8 |
| | | 0000 | RFD+0AH |
| | | 0000 | RFD+0EH |
| | | 0000 | RFD+0CH |
| | | 0000 | RFD+10H |
| | | 0000 | RFD+12H |
| | | 0000 | RFD+14H |
| Receive Buffer | | 0000 | RBD+0 |
| Descriptor (RBD) | | 0000 | RBD+2 |
| | | RDB+0 | RBD+4 |
| | | 0000 | RBD+6 |
| | | 0040H | RBD+8 |
| Receive Data | | 0000 | RDB+0 |
| Buffer (RDB) | | 0000 | RDB+2 |
| | | . | . |
| | | . | . |
| | | 0000 | RDB+3EH |

```
ENDWRITE
CA
```

```
CHECKNIBINTERRUPT
LOOP  WHILE   (INTERRUPT-FLAG=FALSE)
              CHECKNIBINTERRUPT
ENDLOOP
READ
                      NIB Buffer
Data Structure        Memory Address
Command Block         CBL+1AH             (*Status word of
List (CBL)                                last command*)
ENDREAD
LOOP  WHILE   ("CBL+1AH"≠0AXXXH)          (*Wait for 82586 to complete all
                                                       commands*)
READ
                          NIB Buffer
       Data Structure     Memory Address
       Command Block      CBL+1AH
       List (CBL)
       ENDREAD
ENDLOOP
READ
                      NIB Buffer
Data Structure        Memory Address
Command Block         CBL+0AH             (*Transmit command
List (CBL)                                status word*)
ENDREAD
IF       ("CBL+0AH"≠0AXXXH)
         THEN (*Transmission attempt unsuccessful*)
         FILL ERROR-BUFFER WITH "TRANMISSION ERROR"
         ERROR-FLAG=TRUE
         END (*DIAGNOSTICS*)
ENDIF
READ
                      NIB Buffer
Data Structure        Memory Address
Receive Frame         RFD+0               (*Status word of
Descriptor (RFD)                          the Receive Frame
                                          Descriptor*)
ENDREAD
IF       ("RFD+0"≠0A000H)
         THEN  (*Frame not properly received*)
               FILL ERROR-BUFFER WITH "RECEPTION ERROR"
               ERROR-FLAG=TRUE
               END (*DIAGNOSTICS*)
ENDIF
READ
                      NIB Buffer
Data Structure        Memory Address
Receive Data          RDB+0               (*Actual data of
Buffer (RDB)          RDB+2               received frame*)
                         .
                         .
                      RDB+3EH
ENDREAD
J=0       (*J represents data buffer count*)
DATA-ERROR=FALSE
LOOP  (*To check all values of data buffer*)
         IF "RDB+J"≠"TDB+J"   (*Host already knows TDB+J values as
                               these were written earlier*)
               THEN  (*Error found*)
                     DATA-ERROR=TRUE
         ENDIF
         J=J+2    (*Increment by two because this is a word count and
                    not a byte count*)
UNTIL (J=40H) (*Check all values of Receive Data Buffer*)
ENDLOOP
IF       (DATA-ERROR=TRUE)
         THEN  (*Error found in Receive Data Buffer*)
               FILL ERROR-BUFFER WITH "RECEPTION ERROR"
               ERROR-FLAG=TRUE
               END (*DIAGNOSTICS*)
(*This portion of diagnostics checks the serial link between the
82586 and 82501 by using the loopback function of the 82501. This
allows a message to be sent to the 82501 which immediately sends
it back to the 82586*)
WRITE   (*This data written to NIB buffer memory sets the 82586 to
         its external loopback mode, starts the Command Unit and
         Receive Unit and transmits a frame*)
                                                    NIB Buffer
Data Structure                       Data           Memory Address
System Control       (*Start Receive Unit  7110H    SCB+2
```

-continued

| | | | |
|---|---|---|---|
| Block (SCB) | and Control Unit*) | CBL+0 | SCB+4 |
| | | RFD+0 | SCB+6 |
| Command Block | Configure Command | 0000 | CBL+0 |
| List (CBL) | (*Set external | 0002 | CBL+2 |
| | loopback*) | CBL+12H | CBL+4 |
| | | 080CH | CBL+6 |
| | | 8280H | CBL+8 |
| | | 6000H | CBL+0AH |
| | | F200H | CBL+0CH |
| | | 0000H | CBL+0EH |
| | | 0006H | CBL+10H |
| | Transmit Command | 0000 | CBL+12H |
| | (*In external | 0004 | CBL+14H |
| | loopback mode, the | CBL+1EH | CBL+16H |
| | maximum frame size | TBD+0 | CBL+18H |
| | is 18 bytes*) | 0FFFFH | CBL+1AH |
| | | 0000 | CBL+1CH |
| | Configure Command | 0000H | CBL+1EH |
| | (*Clear external | 8002H | CBL+20H |
| | loopback*) | 0000H | CBL+22H |
| | | 080CH | CBL+24H |
| | | 0600H | CBL+26H |
| | | 6000H | CBL+28H |
| | | F200H | CBL+2AH |
| | | 0000H | CBL+2CH |
| | | 0040H | CBL+2EH |
| Transmit Buffer | | 8006H | TBD+0 |
| Descriptor | | 0000 | TBD+2 |
| | | TDB+0 | TBD+4 |
| | | 0000 | TBD+6 |
| Transmit Data | (*Test Data*) | 0AAAAH | TDB+0 |
| Buffer | | 5555H | TDB+2 |
| | | 0AAAAH | TDB+4 |
| Receive Frame | | 0000 | RFD+0 |
| Descriptor (RFD) | | 8000H | RFD+2 |
| | | 0000 | RFD+4 |
| | | RBD+0 | RFD+6 |
| Receive Buffer | | 0000 | RBD+0 |
| Descriptor (RBD) | | 0000 | RBD+2 |
| | | *RDB+0 | RBD+4 |
| | | 0000 | RBD+6 |
| | | 8006H | RBD+8 |

*Receive Data Buffer address immediately follows Receive Buffer
Descriptor and was defined earlier*
ENDWRITE
PULSELOOPBACK (*Follow procedures for setting 82501 loopback
flip-flop*)
CA   (*Alert 82586 to begin processing commands and receiving
frames*)
CHECKNIBINTERRUPT
LOOP   WHILE (INTERRUPT=FALSE) (*Wait for NIB interrupt*)
        CHECKNIBINTERRUPT
ENDLOOP
READ

| | NIB Buffer | |
|---|---|---|
| Data Structure | Memory Address | |
| Command Block | CBL+1EH | (*Status word of |
| List (CBL) | | last command*) |

ENDREAD
LOOP   WHILE ("CBL+1EH"≠0A000H)   (*Wait for 82586 to complete all
commands*)
        READ

| | NIB Buffer |
|---|---|
| Data Structure | Memory Address |
| Command Block | CBL+1EH |
| List (CBL) | |

ENDREAD
ENDLOOP
READ

| | NIB Buffer | |
|---|---|---|
| Data Structure | Memory Address | |
| Command Block | CBL+12H | (*Transmit command |
| List (CBL) | | status word*) |

ENDREAD
IF   ("CBL+12H"≠0AXXXH)
     THEN (*Transmission attempt unsuccessful*)
          FILL ERROR-BUFFER WITH "TRANMISSION ERROR"
          ERROR-FLAG=TRUE
          END (*DIAGNOSTICS*)
ENDIF
READ
                    NIB Buffer -continued

| Data Structure | Memory Address | |
|---|---|---|
| Receive Frame Descriptor (RFD) | RFD+0 | (*Status word of the Receive Frame Descriptor*) |

ENDREAD
IF ("RFD+0"≠0A000H)
    THEN (*Frame not properly received*)
        FILL ERROR-BUFFER WITH "RECEPTION ERROR"
        ERROR-FLAG=TRUE
        END (*DIAGNOTICS*)
ENDIF
READ

| Data Structure | NIB Buffer Memory Address | |
|---|---|---|
| Receive Data Buffer (RDB) | RDB+0 | (*Actual data of received frame*) |
| | RDB+2 | |
| | RDB+4 | |

ENDREAD
J=0 (*J represents data buffer count*)
LOOP (*To check all values of data buffer*)
    IF ("RDB+J"≠"TBD+J")    (*Host already knows TDB+J values as these were written earlier*)
    THEN (*Error found*)
        DATA-ERROR=TRUE
    ENDIF
    J=J+2 (*Increment to next word*)
UNTIL(J=6)
ENDLOOP
IF (DATA-ERROR=TRUE)
THEN (*Error found in received data*)
    FILL ERROR-BUFFER WITH "RECEPTION ERROR"
    ERROR-FLAG=TRUE
    END (*DIAGNOTICS*)
ENDIF
PULSELOOPBACK    (*Follow procedures for clearing 82501 loopback flip-flop*)
(*This portion of diagnostics tests the Ethernet transceiver and cable by using the Time Domain Reflectometer (TDR) command of the 82586.*)
WRITE

| Data Structure | | Data | NIB Buffer Memory Address |
|---|---|---|---|
| System Control Block (SCB) | (*Starts Command Unit*) | 7100H | SCB+2 |
| | | CBL+OH | SCB+4 |
| Command Block List (CBL) | Time Domain Reflectometer (TDR) command | 0000H | CBL+0 |
| | | 8005H | CBL+2 |
| | | 0000H | CBL+4 |
| | | 0000H | CBL+6 |

ENDWRITE
CA (*BEGIN TDR COMMAND*)
CHECKNIBINTERRUPT
LOOP WHILE (INTERRUPT=FALSE) (*Wait for interrupt*)
    CHECKNIBINTERRUPT
ENDLOOP
READ

| Data Structure | NIB Buffer Memory Address | |
|---|---|---|
| Command Block List (CBL) | DBL+6 | (*Status word of TDR command*) |

ENDREAD
CASE ("CBL+6") OF
    6XXXH: (*Indicates Ethernet transceiver problem*)
        FILL ERROR-BUFFER WITH "TRANSCEIVER PROBLEM"
        ERROR-FLAG=TRUE
        END (*DIAGNOSTICS*)
    2XXXH: (*Indicates open on Ethernet cable*)
        FILL ERROR-BUFFER WITH "OPEN ON ETHERNET CABLE"
        ERROR-FLAG=TRUE
        END (*DIAGNOSTICS*)
    1XXXH: (*Indicates a short on Ethernet cable*)
        FILL ERROR-BUFFER WITH "SHORT ON ETHERNET CABLE"
        ERROR-FLAG=TRUE
        END (*DIAGNOSTICS*)
    8XXX: (*Indicates no problem exists and continue with diagnostics*)
ENDCASE
(*These steps acknowledge the interrupts that have been received*)
WRITE

| Data Structure | | Data | NIB Buffer Memory Address |
|---|---|---|---|
| System Control | (*acknowledge | 2000 | SCB+2 |

```
Block (SCB)      interrupts*)
ENDWRITE
CA (*Alert 82586 to acknowledge interrupts*)
END (*Diagnostics*)
```

PROCEDURE CONFIGURATION 824 (PARAMETERS: INDIVIDUAL-MULTICAST- ADDRESSES, ERROR-FLAG, ERROR-BUFFER):
(* * * * * * * * * * * * * * * * * * * * * * * * * * * * * * * * * *
This Procedure 824 enables the user to establish an individual address and multicast address for this NIB. The individual address allows another NIB on the Ethernet cable to transmit data directly to this NIB. This address also identifies frames sent by this NIB, as it is inserted along with the data. This multicast address allows this NIB to receive frames sent by another NIB that are meant to be received by several NIB's at once. This procedure also enables the 82586 to save frames with errors so that the user is immediately aware that a frame was received, even though the data will be useless.
Parameters used by the procedure are:

1. Individual-Multicast addresses which is an array filled by the user which supplies the two six-byte values which are this NIB's particular addresses that it will respond to when receiving frames from other NIB's on the network. The multicast address must be an odd number and the individual address must be an even number.
2. Error-Flag which is set so the user is aware of a problem and knows that the Error-Buffer contains a valid message.
3. Error-Buffer which is filled with a message to notify the user what caused the NIB failure.
* * * * * * * * * * * * * * * * * * * * * * * * * * * * * * * * * *)

GLOBAL CONSTANTS
SCB   (*This constant is the NIB buffer memory address that points to the first word of the System Control Block and is set by the user*)
CBL   (*This constant is the NIB buffer memory address that points to the first word of the Command Block List and is set by the user*)
BEGIN (*CONFIGURATION*)
WRITE (*Commands to configure addresses and to save bad frames*)

| Data Structure | | Data | NIB Buffer Memory Address |
|---|---|---|---|
| System Control Block (SCB) | | 0100H | SCB+2 |
| | | CBL+4 | SCB+4 |
| Command Block List (CBL) | (Individual address command) | 0000 | CBL+1 |
| | | 0001 | CBL+2 |
| | | CBL+0CH | CBL+4 |
| | (Individual Address) | UUUU | CBL+6 |
| | (*LSB*) | UUUU | CBL+8 |
| | (*MSB*) | UUUU | CBL+0AH |
| | (Multicast Address Command) | 0000 | CBL+0CH |
| | | 0003 | CBL+0EH |
| | | CBL+1AH | CBL+10H |
| | | 0006 | CBL+12H |
| | (Multicast Address) | UUUU | CBL+14H |
| | (*LSB*) | UUUU | CBL+16H |
| | (*MSB*) | UUUU | CBL+18H |
| | (Configure Command) | 0000H | CBL+1AH |
| | | 8002H | CBL+1CH |
| | | 0000H | CBL+1EH |
| | | 0804H | CBL+20H |
| | | 0680H | CBL+22H |

NOTE: UUU is the user defined address
ENDWRITE
CA (*Signal 82586 to start processing commands*)
CHECKNIBINTERRUPT (*Check for completing of commands*)
LOOP WHILE (INTERRUPT=FALSE)       (*Wait for 82586 to complete commands*)
   CHECKNIBINTERRUPT
ENDLOOP
READ

| Data Structure | NIB Buffer Memory Address | |
|---|---|---|
| Command Block List (CBL) | CBL+0 | (*Status words for commands*) |
| | CBL+0CH | |
| | CBL+1AH | |

ENDREAD
IF   ("CBL+0"≠0A000H OR "CBL+C"≠0A000H OR "CBL+1A≠0A000H)
     THEN (*Commands not properly completed*)
          FILL ERROR-BUFFER WITH "82586 ERROR"
          ERROR-FLAG=TRUE
          END (*CONFIGURATION*)
ENDIF
WRITE (*Acknowledgement of interrupt*)

| Data Structure | | Data | NIB Buffer Memory Address |
|---|---|---|---|
| System Control Block (SCB) | (*Acknowledging interrupts*) | 2000H | SCB+2 |

ENDWRITE
CA
END (*CONFIGURATION*)

PROCEDURE START-RECEIVE-UNIT 826 (PARAMETERS: NUMBER-RFD, NUMBER-RBD, RDB-SIZE):
(* * * * * * * * * * * * * * * * * * * * * * * * * * * * * * * * * * * * * * * * * *
This procedure 826 sets up all necessary data structures in NIB buffer memory and starts the receive unit so that the 82586 can start receiving frames from the network. The quantity and size of these data structures is determined by the parameters passed to it. Obviously, these numbers must be chosen with the size of this particular NIB buffer memory in mind.
   The parameters used by this procedure are:
     1. Number-RFD which lets the user determine the number of Receive Frame Descriptors (RFD) and thereby the maximum number of frames that can be received at one time without losing any (must be greater than one).
     2. Number-RBD which lets the user determine the number of Receive Buffer Descriptors (RBD) and therefore the number of Receive Data Buffers (RDB) that the 82586 has to use (must be greater than one).
     3. RDB-size which lets the user determine the size of the Receive Data Buffer (RDB) in bytes (must be an even number).
* * * * * * * * * * * * * * * * * * * * * * * * * * * * * * * * * * * * * * * * * *)
RFD       (*This is the NIB buffer memory address that points to the first word of the first Receive Frame Descriptor (RFD) and is defined by the user*)
RBD       (*This is the NIB buffer memory address that points to the first word of the Receive Buffer Descriptor (RBD) and is set by the user*)

-continued

| | |
|---|---|
| SCB | (*This is the NIB buffer memory address that points to the first word of the System Control Block (SCB) and is defined by the user*) |

GLOBAL VARIABLES:

| | |
|---|---|
| RFDHEAD | (*This variable is the NIB buffer memory address that points to the current head of the Receive Frame Descriptor (RFD) list. It is initialized in this procedure to RFD so that Procedure Receive-Data 812 has an initial value*) |

CONSTANTS:

| | |
|---|---|
| RFDSIZE=16H | (*Size by definition of a Receive Frame Descriptor) |
| RBDSIZE=0AH | (*Size by definition of a Receive Buffer Descrptor) |

BEGIN (*START-RECEIVE-UNIT*)

| | |
|---|---|
| RFDHEAD=RFD | (*This defines the global variables RFDHEAD which is used in Procedure Receive-Data*) |

(*This section starts the receive unit*)
WRITE

| Data Structure | | Data | NIB Buffer Memory Address |
|---|---|---|---|
| System Control Block (SCB) | (*Start Receive Unit*) | 0010H | SCB+2 |
| | | CBL+0 | SCB+4 |
| | | CBL+0 | SCB+6 |

ENDWRITE
(*This section creates Receive Frame Descriptors (RFD) and puts them in a cyclic list. The number of RFD's is determined by the parameter Number-RFD*)
WRITE (*First Receive Frame Descriptor*)

| Data Structure | | Data | NIB Buffer Memory Address |
|---|---|---|---|
| Receive Frame Descriptor (RFD) | | 0000 | RFD+0 |
| | | 0000 | RFD+2 |
| | (*pointer to next RFD*) | RFD=RFDSIZE | RFD+4 |
| | (*pointer to first RFD*) | RBD+0 | RFD+6 |
| | | 0000 | RFD+8 |
| | | 0000 | RFD+0AH |
| | | 0000 | RFD+0CH |
| | | 0000 | RFD+0EH |
| | | 0000 | RFD+10H |
| | | 0000 | RFD+12H |
| | | 0000 | RFD+14H |

ENDWRITE
I=1 (*Initialize variable used to count number of RFD's written*)
LOOP WHILE I < (NUMBER-RFD − 1) (*Write remaining RFD's except for last one*)

I=I+1
WRITE

| Data Structure | Data | NIB Buffer Memory Address |
|---|---|---|
| Receive Frame | 0000 | RFD+(RFDSIZE X (I-1))+0 |
| Descriptor (RFD) | 0000 | RFD+(RFDSIZE X (I-1))+2 |
| (*Pointer to | RFD+(RFDSIZE X I) | RFD+(RFDSIZE X (I-1))+4 |
| next RFD*) | 0FFFFH | RFD+(RFDSIZE X (I-1))+6 |
| | 0000 | RFD+(RFDSIZE X (I-1))+8 |
| | 0000 | RFD+(RFDSIZE X (I-1))+0AH |
| | 0000 | RFD+(RFDSIZE X (I-1))+0CH |
| | 0000 | RFD+(RFDSIZE X (I-1))+0EH |
| | 0000 | RFD+(RFDSIZE X (I-1))+10H |
| | 0000 | RFD+(RFDSIZE X (I-1))+12H |
| | 0000 | RFD+(RFDSIZE X (I-1))+14H |

ENDWRITE
ENDLOOP
WRITE (*Write last RFD*)

| Data Structure | Data | NIB Buffer Memory Address |
|---|---|---|
| Receive Frame | 0000 | RFD+RFDSIZE X I)+0 |
| Descriptor (RFD) | 0000 | RFD+RFDSIZE X I)+2 |
| (*Pointer to next | RFD+0 | RFD+RFDSIZE X I)+4 |
| RFD*) | 0FFFFH | RFD+RFDSIZE X I)+6 |
| | 0000 | RFD+RFDSIZE X I)+8 |
| | 0000 | RFD+RFDSIZE X I)+0AH |
| | 0000 | RFD+RFDSIZE X I)+0CH |
| | 0000 | RFD+RFDSIZE X I)+0EH |
| | 0000 | RFD+RFDSIZE X I)+10H |
| | 0000 | RFD+RFDSIZE X I)+12H |
| | 0000 | RFD+RFDSIZE X I)+14H |

ENDWRITE
(*This section creates Receive Buffer Descriptors (RBD), puts them in a cyclic list and allocates memory space for their associated Receive Data Buffers (RDB). The memory space for each Receive Data Buffers is located in separate blocks immediately following each of their associated Receive Buffer Descriptors. The number of Receive Buffer Descriptors is given by the parameter Number-RBD and the size of the Receive Data Buffer by RDB-size.*)
I=0 (Initialize variable that counts the number of RBD's written*)

-continued

```
LOOP  WHILE I < Number-RBD - 1) (*Create all but last RBD*)
      I=I+1
      WRITE
                                             NIB Buffer
      Data Structure          Data           Memory Address
      Receive Buffer          0000           RBD+((RBDSIZE X (I-1))+
      Descriptor (RBD)                       (RBD-SIZE X (I-1))+0
      (*pointer to            RBD+((RBDSIZE X I)+   RBD+((RBDSIZE X (I-1))+
      next RDB*)              (RDB-SIZE X I))       (RBD-SIZE X (I-1))+2
      (*pointer to            RBD+((RBDSIZE X I)+   RBD+((RBDSIZE X (I-1))+
      assoc. RDB*)            (RDB-SIZE X (I-1)))   (RBD-SIZE X (I-1))+4
                              0000           RBD+((RBDSIZE X (I-1))+
                                             (RBD-SIZE X (I-1))+6
                              RDB-SIZE       RBD+((RBDSIZE X (I-1))+
                                             (RBD-SIZE X (I-1))+8
      ENDWRITE
      CA (*Have 82586 start the Receive Unit*)
      END (*START-RECEIVE-UNIT*)
```

```
PROCEDURE TRANSMIT-DATA 814 (PARAMETERS:
TRANSMIT-INTERRUPT,TRANSMIT-DATA-ADDRESS-
TYPE-SIZE, ERROR-FLAG, ERROR-BUFFER):
************************************
This procedure 814 has two main functions. The first is to
transmit a frame of data to any or all other NIB's on the network.
Its second function is to acknowledge the interrupt from the 82586
that a frame has been sent or couldn't be sent.
Parameters used by this procedure are:
1. Transmit-interrupt which is set by Procedure Real-
Time-Communications to let this procedure know that it has been
called to acknowledge an interrupt and not to transmit a frame.
2. Transmit-data-address-type-size which is an array
filled by the user that contains all information necessary to
transmit a frame. This information includes the data to be sent
which can be from 64 to 1518 (Ethernet maximum length) bytes in
length. The address is six bytes long and can be any individual,
multicast or broadcast address (broadcast address is six bytes of
0FFH). The type of information is two bytes in length and can be
any value that the user chooses. Of course, the NIB to which this
data is being sent would have to understand the meaning of this
value for it to serve any purpose. The size information is the
length in bytes of the data that is to be transmitted.
3. Error-flag which is set so the user is aware of a
problem and knows that the Error-buffer contains a valid message.
4. Error-buffer which is filled with a message
describing the nature of the problem with the NIB so that the user
can determine the cause of the problem.
************************************
GLOBAL CONSTANTS
SCB  (*This constant is the NIB buffer memory address of the
      first word of the System Control Block (SCB) and is set
      by the user*)
CBL  (*This constant is the NIB buffer memory address of the
      first word of the Command Block List (CBL) and is set by
      the user*)
TBD  (*This constant is the NIB buffer memory address of the
      first word of the Transmit Buffer Descriptor (TBD) and
      is set by the user*)
CONSTANTS
TBDSIZE=08H    (*The size by definition of a Transmit Buffer
                Descriptor*)
BEGIN (*TRANSMIT-DATA*)
(*This section checks the Transmit-Interrupt flag to determine
whether this procedure was called because a frame has been
transmitted or because the user wishes to transmit a frame*)
IF (TRANSMIT-INTERRUPT=TRUE)
   THEN (*Check for errors and acknowledge interrupt*)
        READ
                            NIB Buffer
        Data Structure      Memory Address
        Command Block       CBL+0           (*Transmit command
        List (CBL)                          status word*)
        ENDREAD
```

-continued

```
        IF ("CBL+0"≠0AXXXH)
           THEN (*Transmission unsuccessful*)
                FILL ERROR-BUFFER WITH "TRANS-
                MISSION ERROR"
                ERROR-FLAG=TRUE
                END (*TRANSMIT-DATA*)
        ENDIF
        WRITE (*Acknowledge transmission interrupt*)
                                        NIB Buffer
        Data Structure      Data        Memory Address
        System Control      2000H       SCB+2
        Block (SCB)
        ENDWRITE
   ELSE (*The user wishes to transmit a frame*)
        TDBSIZE=SIZE FIELD OF TRANSMIT-DATA-
        ADDRESS-TYPE-SIZE ARRAY
        TDB=TBD+TBDSIZE      (*Transmit Data Buffer is
                              located immediately after
                              Transmit Buffer
                              Descriptor*)
        WRITE (*Transmit command and data*)
                                              NIB Buffer
                                              Memory
        Data Structure                Data    Address
        System Control  (*Start Command  0100H    SCB+2
        Block (SCB)     Unit*)           CBL+0    SCB+4
        Command Block   (*Transmit       0000     CBL+0
        List (CBL)      Command*)        8004H    CBL+2
                                         0000     CBL+4
                                         TBD+0    CBL+6
        (*User defined              LSB  UUUU     CBL+8
        destination address*)            UUUU     CBL+0AH
                                    MSB  UUUU     CBL+0CH
        (*User defined type field*)      UUUU     CBL+0EH
                                              NIB Buffer
        Data Structure                Data    Memory Address
        Transmit Buffer (*User        8UUU    TBD+0
        Descriptor (TBD)  defined     0000    TBD+2
                          size        TBD+0   TBD+4
                          field*)     0000    TBD+6
        Transmit Data    (*User       UUUU    TDB+0
        Buffer (TDB)      defined     UUUU    TDB+2
                          data*)      UUUU    TDB+4
                                      .
                                      .
                                      .
                                      UUUU    TDB+(TDBSIZE-2)
        ENDWRITE
        CA (*Start 82586 transmission process*)
ENDIF
END (*TRANSMIT-DATA*)
```

```
PROCEDURE RECEIVE-DATA 812 (PARAMETERS: RECEIVE-FLAG,
RECEIVE-DATA-ADDRESS-TYPE-SIZE):
************************************************
```

-continued

This procedure 812 is used to remove received data from the NIB buffer memory and pass it back to the user. All frames of data that have been received since the last time this procedure was called will be loaded into Receive-data-address-type-size arrays. This procedure will set a Receive-flag to notify the user that all or some of the Receive-data-address-type-size arrays have been filled. The user must insure that the Procedure real-time-communications 802 is called often enough to allow this procedure to empty the NIB buffer memory before it runs out of memory space to receive frames.
This procedure expects all data structures to be set up as Procedure Start-receive-unit 826 initializes them. Also, the global variable RFDHEAD should be initialized in Procedure start-receive-unit to the address in NIB buffer memory that points to the first Receive Frame Descriptor.
The parameters used by the procedure 812 are:
1. Receive-flag which is used to inform the user that the receive-data-address-type-size arrays contain one or more frames of data. When this flag is set true, the user must inspect and empty all of these arrays.
2. Receive-data-address-type-size which are a number of arrays that contain all the frames of data received from the Ethernet. The fields it contains are: data which is a field that can contain from 64 to 1518 bytes of received data; address which is a six-byte field containing the address of the source of the data; type which is a two-byte field that defines the number of valid bytes of data contained in the data field. When the size field contains 0001H, then the frame received was bad and no valid data exists. When this field contains 0000, then the entire array is unused. The user should clear this field after emptying that array.
* * * * * * * * * * * * * * * * * * * * * * * * * * * * * * * * * * * * * * * * * * * * * * * * * * * * * * * * * * * *

GLOBAL VARIABLE:

RFDHEAD    (*Points to the head of the list of Receive Frame Descriptors and is initialized by Procedure Start-receive-unit when it initializes the data structures*)

CONSTANTS:
RBDSIZE=0AH    (*Size by definition of a Receive Buffer Descriptor*)
BEGIN    (*RECEIVE-DATA*)
Read    (*Read status of Receive Frame Descriptor currently at the head of the cyclic list*)

| Data Structure | NIB Buffer Memory Address |
|---|---|
| Receive Frame Descriptor | RFDHEAD+0 |

ENDREAD
LOOP WHILE    ("RFDHEAD+0" = 1XXX XXXX XXXX XXXX (BINARY))    (*Process all full Receive Frame Descriptors IF "RFDHEAD+0" = A000H
        THEN (*Frame contains good data*)
            READ

| Data Structure | NIB Buffer Memory Address |
|---|---|
| Receive Frame Descriptor (RFD) | , RFD=0EH (*Source address, least RFDHEAD=10H significant byte*) RFDHEAD=12H (*Most significant byte*) RFDHEAD=14H (*Type field*) |

ENDREAD
            FILL CURRENT RECEIVE-DATA-ADDRESS-TYPE-SIZE-ARRAY WITH ADDRESS ("RFDHEAD=0EH", "RFDHEAD+10H", "RFDHEAD=12H") AND TYPE ("RFDHEAD=14H")
            READ

| Data structure | NIB Buffer Memory Address |
|---|---|
| Receive Frame Descriptor (RFD) | RFDHEAD+6 (*Pointer to first Receive Buffer Descriptor*) |

ENDREAD
            RBDPOINTER:="RFDHEAD=6"
            FRAMESIZE:=0    (*Initialize variable that keeps count of the number of bytes in this frame*)
            LOOP .    (*Process all Receive Buffer Descriptors and their associated Receive Data Buffers*)
                READ    (*Read first word of current Receive Buffer Descriptor*)

| Data Structure | NIB Buffer Memory Address |
|---|---|
| Receive Buffer Descriptor (RBD) | RBDPOINTER+0 |

ENDREAD
            RBDSIZE=RDBPOINTER+0" AND 3FFFH (*This is a logical "and" operation that strips off the two most significant bits of "RDBPOINTER+0" which leaves the number of actual bytes of valid data that are stored in this Receive Data Buffer in

```
                                    the variable RDBSIZE*)
                                    FRAMESIZE = FRAMESIZE + RDBSIZE (*Keeps track of
                                    the number of valid bytes of data
                                    associated with this frame*)
(*This code will read all valid data from the Receive Data Buffer
associated with this Receive Buffer Descriptor. However, if
RDBSIZE is an odd number, then the most significant byte of the
last word of the Receive Data Buffer will be non-valid data.
RDBSIZE will only be odd if this is the last Receive Data Buffer
associated with the entire frame*)
                                    RDBPOINTER = RDBPOINTER + RDBSIZE (*Receive Data
                                    Buffer immediately follows its associ-
                                    ated Receive Buffer Descriptor which is
                                    RDBSIZE in length. Therefore, RDBPOINTER
                                    will point to the first valid word of
                                    data in the Receive Data Buffer after
                                    this addition is completed*)
                                    READ (*Data from the Receive Data Buffer*)
                                                                NIB Buffer
Data Structure                                                  Memory Address
Receive Data                        RDBPOINTER + 0 (*First word of RDB*)
Buffer (RDB)                                    RDBPOINTER + 2

.
                                                     .
                        RDBPOINTER + (RDBSIZE - 2)              (*Last bytes
                                                                of valid data
                                                                in RDB*)
                                    ENDREAD
                                    FILL RECEIVE-DATA-ADDRESS-TYPE-SIZE ARRAY WITH
                                    THE VALID DATA "RDBPOINTER + 0" THROUGH
                                    "RDBPOINTER + (RDBSIZE - 2)"
                                    WRITE (*This clears the current Receive Buffer
                                             Descriptor for use by another incoming
                                             frame*)
                                                                NIB Buffer
Data Structure                          Data                    Memory Address
Receive Buffer                          0000                    RDBPOINTER + 0
Descriptor (RBD)
                                    ENDWRITE
                                    READ  (*Pointer to the next Receive Buffer
                                             Descriptor*)
                                                                NIB Buffer
Data Structure                                                  Memory Address
Receive Data                        RDBPOINTER + 2              (*This location contains
                                                                the address of the next
                                                                Receive Buffer
                                                                Descriptor
                                    ENDREAD
                                    RBDPOINTER: = "RBDPOINTER + 2"   (*Store address of
                                                                      next Receive
                                                                      Buffer Descriptor
                                                                      in RBDPOINTER*)
                                    UNTIL ("RBDPOINTER + 0" ≠ 1XXX XXXX XXXX XXXX
                                    (BINARY))
                                                (*RBDPOINTER + 0" still contains the value
                                                from the Receive Buffer Descriptor that
                                                has already been processed. This checks
                                                to see if it was the last RBD associated
                                                with this frame or if the entire process
                                                needs to be repeated for the next
                                                Receive Buffer Descriptor*)
                                    ENDLOOP    (*After all Receive Buffer Descriptors
                                                associated with this frame have been
                                                processed*)
                                    FILL RECEIVE-DATA-ADDRESS-TYPE-SIZE ARRAY SIZE
                                    FILED WITH FRAMESIZE (*This puts the total
                                    number of valid bytes of this frame into the
                                    size field of the array*)
        ELSE                (*Frame received contains errors and is unusable.
                            This code puts the Receiver Buffer Descriptors back
                            in use for other frames*)
                                    FILL RECEIVE-DATA-ADDRESS-TYPE-SIZE ARRAY WITH
                                    SIZE FIELD = 0001. (*This informs the user that
                                    a frame was received but its data was
                                    unusable*)
                                    READ
                                                                NIB Buffer
Data Structure                                                  Memory Address
Receive Frame                       RFDHEAD + 6                 (*This location holds a
Descriptor (RFD)                                                pointer to the first
```

|  |  |  |  |
|---|---|---|---|
|  |  | Receive Buffer Descriptor associated with this bad frame*) |  |
|  |  | ENDREAD |  |
|  |  | RBDPOINTER:="RBDPOINTER+6" | (*Store address of first Receive Buffer Descriptor in RBDPOINTER*) |
|  |  | IF RBDPOINTER≠0FFFFH (*This checks to see if there are any Receive Buffer Descriptors associated with this frame. An address of 0FFFFH indicates that there are none. This is possible with a bad frame*) |  |
|  |  | LOOP (*Until all Receive Buffer Descriptors associated with this bad frame are returned for use*) |  |
|  |  | READ |  |

| Data Structure | NIB Buffer Memory Address |
|---|---|
| Receive Buffer Descriptor (RBD) | RBDPPOINTER+0 (*First word of current RBD*) |
|  | RBDPOINTER+2 (*Address of next RBD*) |

ENDREAD
WRITE (*Clear this RBD for use. RBDPOINTER still contains address of Receive Buffer Descriptor that has just been processed*)

| Data Structure | Data | NIB Buffer Memory Address |
|---|---|---|
| Receive Buffer Descriptor (RBD) | 0000 | RBDPOINTER+0 |

ENDWRITE
RBDPOINTER="RBDPOINTER+2" (*Store address of next Receive Buffer Descriptor in RBDPOINTER*)
UNTIL ("RBDPOINTER+0≠1XXX XXXX XXXX XXXX (BINARY)) (*"RBDPOINTER+0" still contains the first word of the Receive Buffer Descriptor that was just processed and this checks if it was the last one or if there are more*)
ENDLOOP (*When all Receive Buffer Descriptors have been returned for the 82586 to use*)
ENDIF
ENDIF
(*The current Receive Frame descriptor has now been completely processed*)
WRITE (*Return this Receive Frame Descriptor for the 82586 to use with new frames. These "writes" must be accomplished in the order shown*)

| Data Structure |  | Data | NIB Buffer Memory Address |
|---|---|---|---|
| Receive Frame Descriptor (RFD) | (*Reset RBD pointer*) | 0FFFFH | RFDHEAD+6 |
|  | (*Clear RFD for use*) | 0000 | RFDHEAD+0 |

ENDWRITE
READ (*Get pointer to next Receive Frame Descriptor*)

| Data Structure |  | NIB Buffer Memory Address |
|---|---|---|
| Receive Frame Descriptor (RFD) | (*Pointer to next RFD*) | RFDHEAD+4 |

ENDREAD
RFDHEAD="RFDHEAD+4" (*Redefine RFD pointer*)
READ

| Data Structure | NIB Buffer Memory Address |
|---|---|
| Receive Frame Descriptor (RFD) | RFDHEAD+0 |

ENDREAD
ENDLOOP (*When all used Receive Frame Descriptors have been processed and returned for use*)
RECEIVE-FLAG=TRUE (*Set flag to inform user that frames have been received and RECEIVE-DATA-ADDRESS-TYPE arrays must be emptied*)
WRITE (*Acknowledge received frame interrupt*)

| Data Structure | Data | NIB Buffer Memory Address |
|---|---|---|
| System Control Block (SCB) | 4000H | SCB+2 |

ENDWRITE

| | -continued |
|---|---|
| CA | (*Signal 82586 to check System Control Block and clear interrupts*) |
| END | (*RECEIVE-DATA*) |

What is claimed is:

1. An interface module for use between a host computer and a transceiver of a local area network, said interface module comprising:

communications means coupled to said transceiver for transmitting information to and receiving information from the local area network, with the communications means including a controller unit having a transmit mode and a receive mode;

a buffer memory, bus means comprising an address bus and a data bus, with the address bus coupled to address inputs of the buffer memory for parallel input of addresses, and the data bus coupled to two-way data terminals of the buffer memory for parallel input and output of data, controller interface means including a controller line coupled to a set of terminals of the controller for two-way parallel transfer of addresses and data between the controller and the bus means, host interface means including a host line coupled to a set of terminals of the host computer for two-way parallel transfer of addresses and data between the host computer and the bus means, and memory read and write lines connected from the controller and also from the host interface means to read and write control terminals of the memory;

bus control means including a bistable device having a controller state and a host state, coupling from the bistable device to the controller interface means, to the host interface means and to the host computer to indicate the current state of the bistable device, a connection from the controller to a hold input of the bus control means, means in the bus control means responsive to a hold signal at the hold input and a selected condition to set the bistable device to the controller state, hold-acknowledge gate means with inputs from the hold input and the bistable device and an output to the controller for a hold-acknowledge signal indicating coincidence of the hold signal and said controller state, a connection from the host computer to a bus request input of the bus control means, means in the bus control means responsive to a request signal at the bus request input and no active signal at the hold input to set the bistable device to the host state;

wherein said controller interface means comprises address latch means having a set of inputs coupled to said controller line and a set of outputs coupled to said address bus, controller data buffers coupled between said controller line and said data bus for parallel transfer of data in either direction, the address latches having a strobe terminal coupled to the controller for a signal from the controller to latch an address from the controller line, the controller data buffers having a direction-control terminal coupled to the controller for a signal from the controller to determine the direction of transfer, means including the coupling from the bus control means to the controller interface means and coupling to the controller for enabling the address latches to supply address signals via the address bus to the memory and for enabling the controller data buffers for effectively coupling the controller line via the data bus to the memory, so that the controller using signals on the memory read and write lines may selectively transfer data into and out of the buffer memory;

wherein said host interface means comprises address counter/latch means having a set of inputs coupled to said host line and a set of outputs coupled to said address bus, host data buffers coupled between said host line and said data bus for parallel transfer of data in either direction, a set of type/direction control lines including a peripheral-write-address line, a peripheral-write-data line, and a peripheral-read-data line, said type/direction control lines being coupled to receive signals lrom the host computer for controlling the host interface means, the host data buffers having a direction-control terminal coupled to one of said type/direction control lines to determine the direction of transfer, data-ackno Wledge means having a data-synchronization-strobe input coupled to the host computer and an input connected to the peripheral-read-data line, the data-acknowledge means being responsive either to a given signal condition at the data-synchronization-strobe input or to a change to an active condition on the peripheral-read-data line for providing a predetermined delay and then generating an acknowledge pulse on a data-acknowledge line coupled to the host computer, means effective with an active signal on the peripheral-write-address line for parallel loading of an address from the host line into the address counter/latch means, means effective responsive to said given signal condition at the data-synchronization-strobe input and an active signal on the peripheral-write-address line for generating a write-enable signal on a peripheral-write-enable line, the peripheral-read-data line and the peripheral-write-enable line being coupled via host signal buffers to the memory read and write lines. means including the coupling from the bus control means to the host interface means for enabling the address/counter latch means to supply address signals via the address bus to the memory, for enabling the host data buffers for effectively coupling the host line via the host data buffers and the data bus to the memory, and for enabling the host signal buffers so that the host computer using signals on the peripheral-write-data line and peripheral-read-data lines along with the given signal condition at the data-synchronization-strobe input may selectively transfer data into and out of the buffer memory, and means effective in response to each occurrence of the given signal condition at the data-synchronization-strobe input for operating the address counter/latch means as a counter to advance the address to consecutive locations in the buffer memory.

2. An interface module according to claim 1, wherein said communications means includes a system clock coupled to supply clock signals to said controller unit, and wherein said data-knowleldge means comprises a shift register having a clock input coupled to the system clock, monostable device means having an input connected to said data-synchronization-strobe input for generating an acknowledge pulse of a given duration in response to a change of signal state at the data-synchronization-strobe input, an acknowledge pulse line having an optional connection either directly to the data-synchronization-strobe input for an option in which an acknowledge pulse is supplied by the host computer or an alternative option in which the acknowledge pulse line is connected to an output of the monostable device means, read pulse generator means having an input coupled to the peripheral-read-data line for generating an acknowledge pulse of said given duration in response to a change of signal to the active state on the peripheral-read-data line, a shift register for providing said predetermined delay, with the shift register having a serial input coupled via OR means to the acknowledge pulse line and to an output of the read pulse generator means, a clock input coupled to said system clock, and a serial output connected to the data-acknowledge line;

and wherein said means for generating a write-enable signal includes a write pulse generator having an input coupled to said acknowledge pulse line and actuated in respons to the leading edge of each acknowledge pulse to generate at its output a pulse which is shorter than the acknowledge pulse, with AND means having inputs from the output of the write pulse generator and the peripheral-write-data line and an output to the peripheral-write-enable line.

3. An interface module according to claim 2, wherein said address counter/latch means comprises a plurality of counter/latch chips and a plurality of buffers, each counter/latch chip comprising a set of latches having inputs connected to leads of said host line and outputs coupled via the buffers to said address bus, each counter/latch chip having a clock input, a load control input and a ripple carry output, organized either for parallel input in response to a clock signal at the clock input and an enable signal at the load input, or to act as a counter in response to clock signals at the clock input when the load input is not enabled, the counter/latch chips being arranged in order from a first for least significant bits to a last for most significant bits, with ripple carry gate means coupling the ripple carry output of each except the last to the clock input of the next. the clock input of the first being coupled to an address clock lead, AND means having inputs from the peripheral-write-address line and said write pulse generator and an output coupled via a peripheral-write-address control line to the ripple carry gate means, the output of the last said AND means also being coupled via address-clock OR means to the address clock lead. said peripheral-write-address line being coupled to the load inputs of all of the counter/latch chips and also coupled to the ripple carry gate means so that with an active signal on the peripheral write address line a pulse from the write pulse generator is supplied to the clock inputs of all of the counter/latch chips and the chips are enabled to load an address from the host line, and with an inactive signal on the peripheral-write-address line the ripple carry gate means is enabled for ripple carry operation from chip to chip and each pulse on the address clock lead advances the value of the address;

and wherein said means including the coupling from the bus control means to the host interface means for enabling the address/counter latch means to supply address signals via the address bus to the memory comprises a connection from said bistable device to enable inputs of the buffers.

4. An interface module according to claim 3, wherein said means for operating the address counter/latch means as a counter includes a connection from the output of the write pulse generator via delay means to first AND means having an input connected to the peripheral-write-data line, and a connection from the output of the write pulse generator to second AND means having an input connected to the peripheral-read-data line, the outputs of the first and second AND means being coupled via the address-clock OR means to the address clock lead.

5. An interface module according to claim 4, wherein the last counter/latch chip has one of its outputs connected directly via a channel attention control line to a channel attention terminal of said controller unit, for a signal to the controller unit that the host computer has placed commands in the buffer memory.

6. An interface module according to claim 5, wherein the last counter/latch chip has one of its outputs connected to a loopback control line, and wherein said communications means includes a serial interface unit coupled between the controller unit and the transceiver, a loopback control flip-flop having a clock input connected to the loopback control line to operate it in a toggle mode, the loopback control flip-flop having an output connected to the serial interface unit to selectively cause operation in a loopback mode for test purposes depending on the state of the loopback control flip flop.

7. An interface module according to claim 6, wherein the controller unit has an interrupt output terminal coupled to an interrupt input terminal of the host computer for the controller unit to signal the host computer for attention, and a reset output of the host computer is coupled to a reset input of the communications means for setting to an initial state.

8. A method of interfacing a host computer and a communications system which is part of a network using an interface module which includes a buffer memory and a controller which is part of the communications system, said method comprising the steps:

calling a real-time-communications procedure which is used to ready the interface module for communications, to check for received frames and remove any of them from the buffer memory, and to transmit a frame of data to any other interface module on the network; this procedure including the step of checking interrupts, calling a start-up procedure in response to a start flag being true, calling a receive-data procedure in response to an interrupt signifying a frame has been received, or calling a transmit-data procedure in response to a transmit interrupt;

the start-up procedure being used to initialize, run diagnostics on, configure and start a receive unit of the interface module, and being called when it is desired to start the interface module initially or try to restart it after an interface module system failure, this procedure being able to proceed to the steps of calling an initialize procedure, a diagnostics procedure, a configure procedure, or a start-receive-unit procedure;

the initialize procedure being used to bring the interface module to a predetermined state by strobing a reset control line, and readies it to accept commands by writing initialization data and producing a signal on a channel attention control line;

the diagnostics procedure being used to check the controller and other communications circuits;

the configure procedure being used to establish an individual address and multicast address for this interface module, wherein the individual address allows another interface module of the network to transmit data directly to this interface module, this address also identifying frames sent by this interface module, as it is inserted along with data, the multicast address allowing this interface module to receive frames sent by another interface module that are meant to be received by several interface modules at once, the configure procedure also being used to enable the controller to save frames with errors to immediately indicate that a frame was received, even though the data will be useless;

the start-receive-unit procedure being used to set up all necessary data structures in the buffer memory and to start a receive unit so that the controller can start receiving frames from the network, the quantity and size of these data structures being determined by parameters passed to it;

the transmit-data procedure having two main functions depending on the state of a transmit interrupt, the first, in response to the transmit interrupt being not true, being to transmit a frame of data to any or all other interface modules on the network, or its second function, in response to the transmit interrupt being true, being to acknowledge an interrupt from the controller that a frame has been sent or could not be sent;

the receive-data procedure being to remove received data from the buffer memory and pass it back to the host computer, all frames of data that have been received since the last time this procedure was called being loaded into receive-data-address-type-size arrays, the receive-data procedure being also used to set a receive-flag to notify that all or some of the receive-data-address-type-size arrays have been filled, it being necessary that the real-time-communications procedure be called often enough to allow this procedure to empty the buffer memory before it runs out of memory space to receive frames.

* * * * *

UNITED STATES PATENT AND TRADEMARK OFFICE
CERTIFICATE OF CORRECTION

PATENT NO. : 4,672,570

DATED : June 9, 1987

INVENTOR(S) : Richard P. Benken

It is certified that error appears in the above-identified patent and that said Letters Patent is hereby corrected as shown below:

Col 2, line 36, "dlgital" should be --digital--.

Col 2, line 53, "an" should be --and--.

Col 2, line 55, "a" should be --an--.

Col 3, line 54, "includinq" should be --including--.

Col 3, line 67, "a" should be --an--. (2nd occurrence)

Col 4, line 4, there should be a "comma (,)" between words "line" and "an".

Col 4, line 15, there should be a "comma (,)" between words "memory" and "the".

Col 4, line 33, "colon (:)" should be a --semicolon (;)--.

Col 4, lin 42, delete "comma (,)".

Col 4, line 55, "Are" should be --Area--.

Col 4, line 56, "Placed" should not be capped.

Col 5, line 34, there should be a "period (.)" between "LAN" and "It".

Col 5, line 45, "oontrolled" should be --controller--.

Col 5, line 46, "transoeiver" should be --transceiver--.

Col 6, line 3, "3o" should be --30--.

Col 6, line 8, "memor" should be --memory--.

UNITED STATES PATENT AND TRADEMARK OFFICE
CERTIFICATE OF CORRECTION

PATENT NO. : 4,672,570

DATED : June 9, 1987

INVENTOR(S) : Richard P. Benken

It is certified that error appears in the above-identified patent and that said Letters Patent is hereby corrected as shown below:

Col 7, line 45, there should be a "comma (,)" between "volts" and "a".

Col 7, line 62, there should be a "10" between "have" and "address".

Col 7, line 68, "74KS138" should be --74LS138--.

Col 8, line 21, "pA" should be --PA--.

Col 8, line 25, "A)-A7" should be --A0-A7--.

Col 8, line 51, there should be a "period"(.) between "30" and "The".

Col 8, line 66, no "period" after "transfer".

Col 9, line 11, "ty" should be --type--.

Col 9, line 14, "pDA" should be "PDA".

Col 9, line 23, "memor" should be --memory--.

Col 9, line 41, "t" should be --to--.

Col 9, line 51, "beloW" should be --below--.

Col 10, line 6, "memor" should be --memory--

Col 10, line 23, "15o" should be --150--.

Col 10, line 54, "peripheral" should be capitalized.

Col 11, line 4, "a" should be --an--.

Col 11, line 6, "o" should be --on--.

Col 11, line 11, there should be a "period (.)" after 30.

UNITED STATES PATENT AND TRADEMARK OFFICE
CERTIFICATE OF CORRECTION

PATENT NO. : 4,672,570

DATED : June 9, 1987

INVENTOR(S) : Richard P. Benken

It is certified that error appears in the above-identified patent and that said Letters Patent is hereby corrected as shown below:

Col 11, line 14, there should be a "comma (,)" after "tandem", not "period" (.).

Col 11, line 27, "peripheral" should be capitalized.

Col 14, line 40, "conlrol" should be --control--.

Col 16, line 39, "an" should be --any--.

Col 17, line 24, "no" should be --non--.

Col 19, line 29, there should be a "comma (,)" after "transceiver--.

Col 19, line 41, there should be a "comma (,)" after "(RFD)", not "period (.)".

Col 22, line 60, delete "Y".

Col 33, third from last line, "DIAGNOTICS" should be --DIAGNOSTICS--.

Col 35, line 10, and line 33, "DIAGNOTICS" should be --DIAGNOSTICS--.

UNITED STATES PATENT AND TRADEMARK OFFICE
CERTIFICATE OF CORRECTION

PATENT NO. : 4,672,570

DATED : June 9, 1987

INVENTOR(S) : Richard P. Benken

It is certified that error appears in the above-identified patent and that said Letters Patent is hereby corrected as shown below:

In the Claims:

Claim 1, Col 50, line 27, "ackno₩ledge" should be --acknowledge--.

Claim 2, Col 51, lines 11 and 12, "aternative" should be --alternative--.

Claim 3, Col 51, line 59, there should be a "comma (,)" after "lead", not a "period (.)".

Signed and Sealed this

Fifth Day of April, 1988

Attest:

DONALD J. QUIGG

Attesting Officer

Commissioner of Patents and Trademarks